(12) United States Patent
Koarai et al.

(10) Patent No.: US 10,640,028 B2
(45) Date of Patent: May 5, 2020

(54) CUP HOLDER

(71) Applicant: MORIROKU TECHNOLOGY COMPANY, LTD., Tokyo (JP)

(72) Inventors: Manabu Koarai, Tokyo (JP); Nobuhito Tsuku, Tokyo (JP); Yusuke Kotsuji, Tokyo (JP)

(73) Assignee: MORIROKU TECHNOLOGY COMPANY LTD., Tokyo (JP)

(*) Notice: Subject to any disclaimer, the term of this patent is extended or adjusted under 35 U.S.C. 154(b) by 0 days.

(21) Appl. No.: 16/138,300

(22) Filed: Sep. 21, 2018

(65) Prior Publication Data

US 2019/0111824 A1 Apr. 18, 2019

(30) Foreign Application Priority Data

Oct. 12, 2017 (JP) .................................. 2017-198127
May 24, 2018 (JP) .................................. 2018-099732

(51) Int. Cl.
*B60N 3/10* (2006.01)
*F16H 21/44* (2006.01)
*G05G 5/18* (2006.01)
*F16C 1/10* (2006.01)

(52) U.S. Cl.
CPC ............ *B60N 3/105* (2013.01); *B60N 3/106* (2013.01); *F16C 1/10* (2013.01); *F16H 21/44* (2013.01); *G05G 5/18* (2013.01)

(58) Field of Classification Search
CPC ........ B60N 3/105; B60N 3/108; B60N 3/101; G05G 5/18; F16H 21/44; F16C 1/10; B60R 7/04

USPC ......... 248/311.2, 310, 313, 346.06; 206/427, 206/140, 159, 167; 220/495.02
See application file for complete search history.

(56) References Cited

U.S. PATENT DOCUMENTS

| | | | | |
|---|---|---|---|---|
| 7,380,762 B2* | 6/2008 | Takeichi | ................ | B60N 3/106 248/309.1 |
| 7,597,300 B2* | 10/2009 | Harada | ............... | A47G 23/0225 220/282 |
| 2013/0038097 A1* | 2/2013 | Oldani | .................... | B60N 3/102 297/188.14 |
| 2015/0201780 A1* | 7/2015 | Yokota | .................. | B65D 21/08 220/720 |
| 2015/0251582 A1* | 9/2015 | Sawada | .................... | B60N 3/10 220/737 |
| 2018/0105089 A1* | 4/2018 | Inoue | ....................... | B60R 7/06 |
| 2018/0215301 A1* | 8/2018 | Smithson | ........... | A47G 23/0241 |
| 2019/0084475 A1* | 3/2019 | Tokunaga | .............. | B60Q 3/225 |
| 2019/0111824 A1* | 4/2019 | Koarai | .................. | B60N 3/105 |

FOREIGN PATENT DOCUMENTS

JP 2010-000823 1/2010
JP 2015-136976 7/2015

OTHER PUBLICATIONS

Japanese Office Action dated Aug. 26, 2019, English translation included, 8 pages.

\* cited by examiner

*Primary Examiner* — Muhammad Ijaz
(74) *Attorney, Agent, or Firm* — Rankin, Hill & Clark LLP

(57) ABSTRACT

A cup holder includes a coupling member that causes a locking pawl to be engaged with a locking recess when a cam plate is catching a beverage container, and causes the locking pawl to be disengaged from the locking pawl when the cam plate does not catch the beverage container.

6 Claims, 15 Drawing Sheets

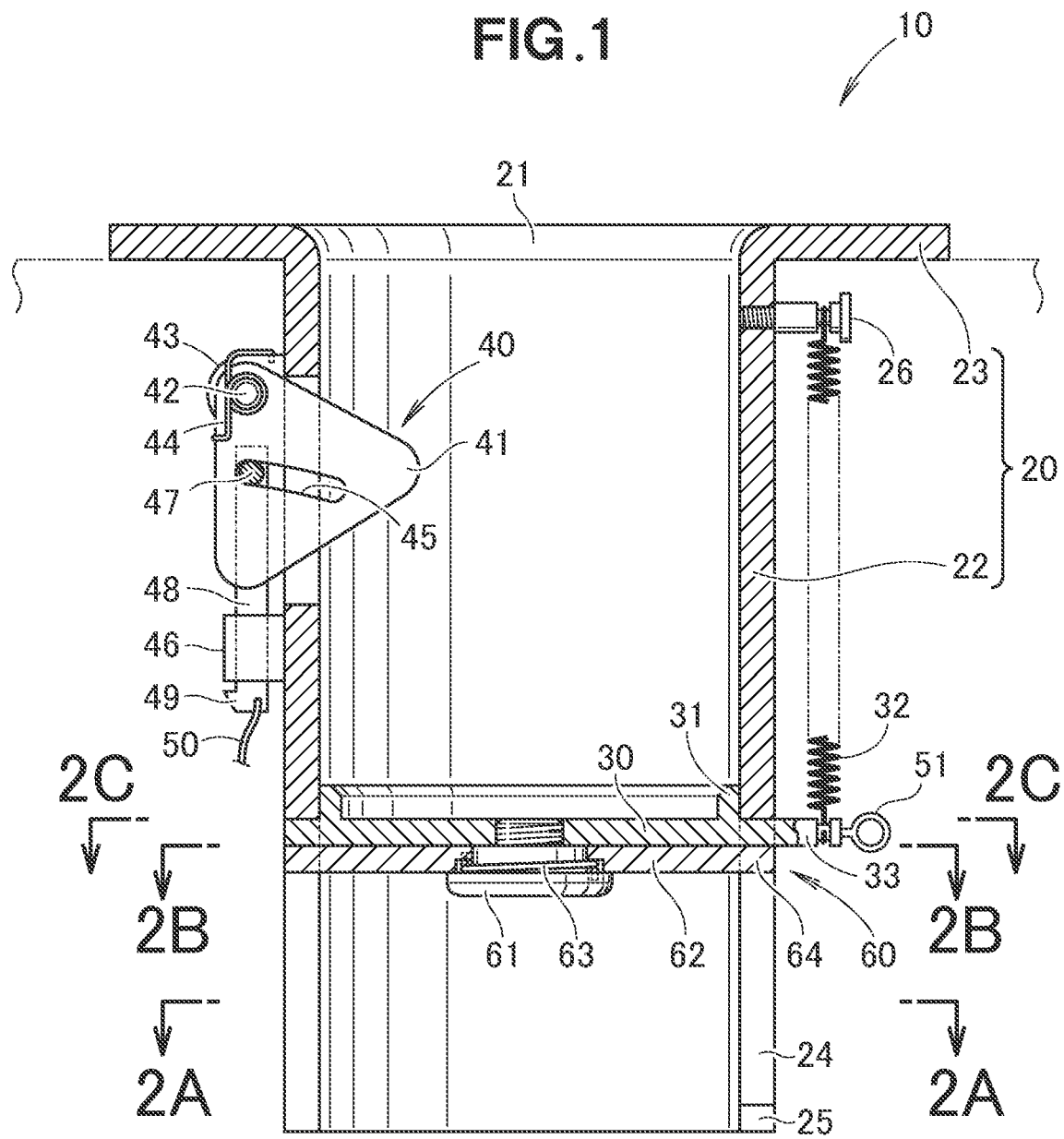

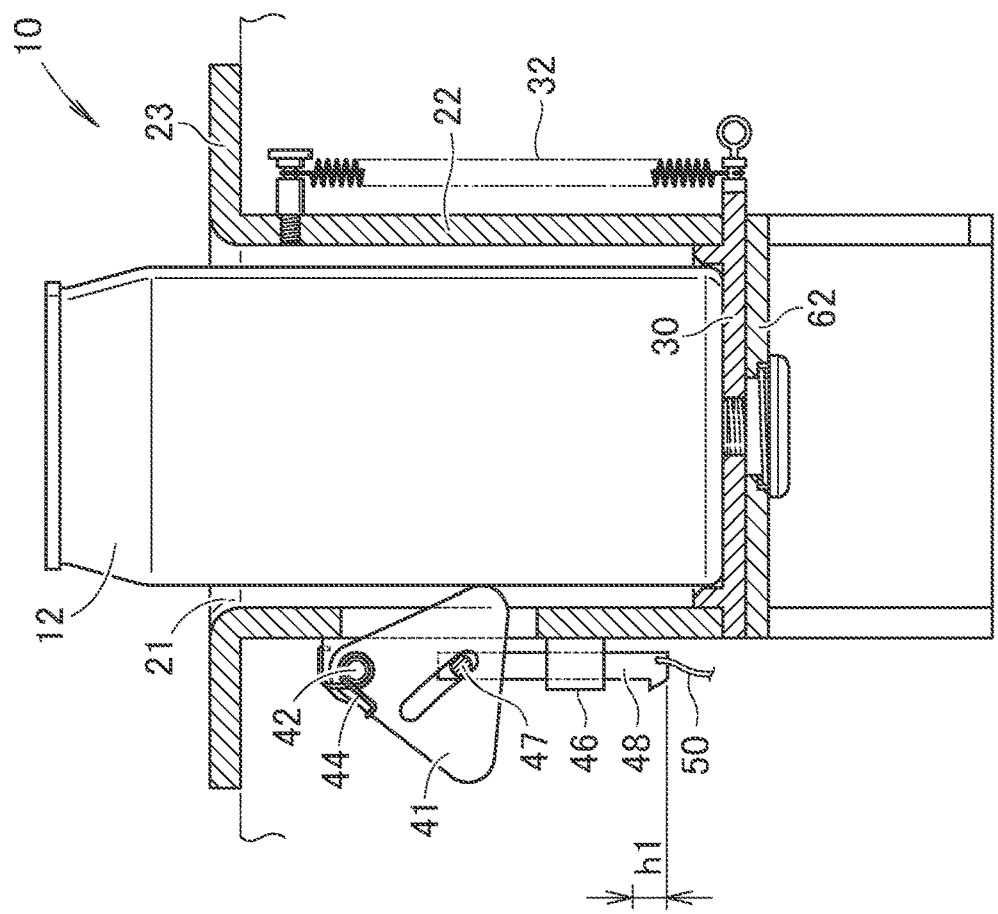
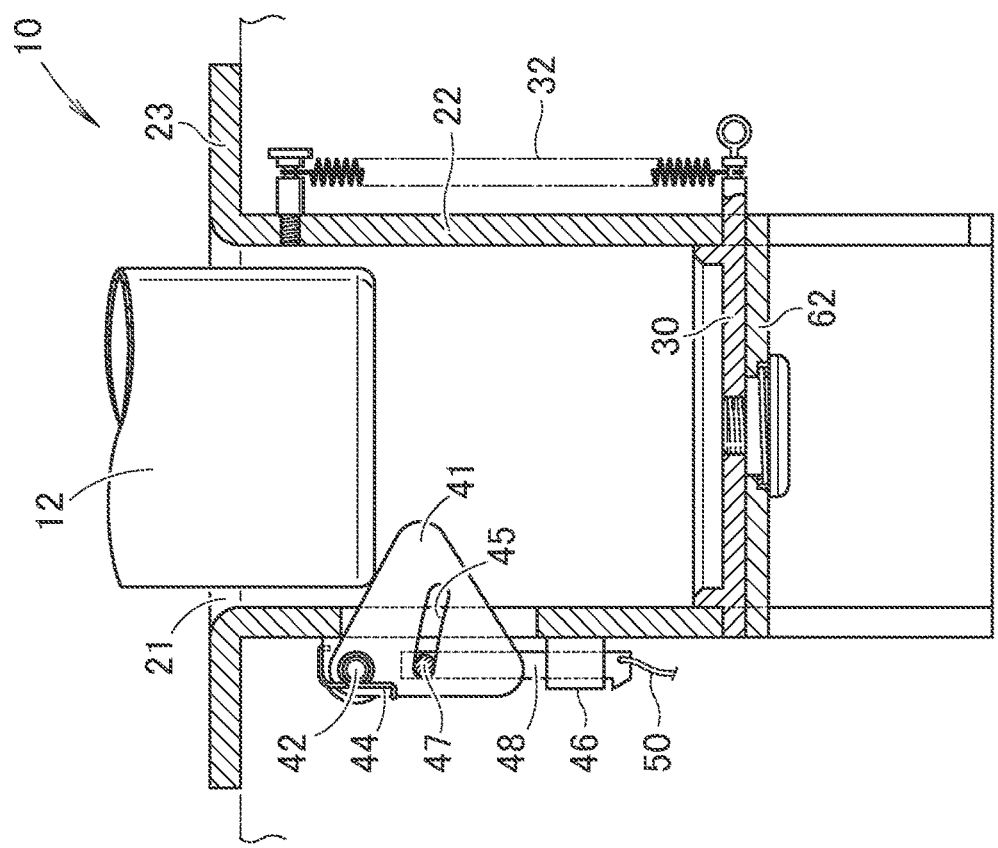

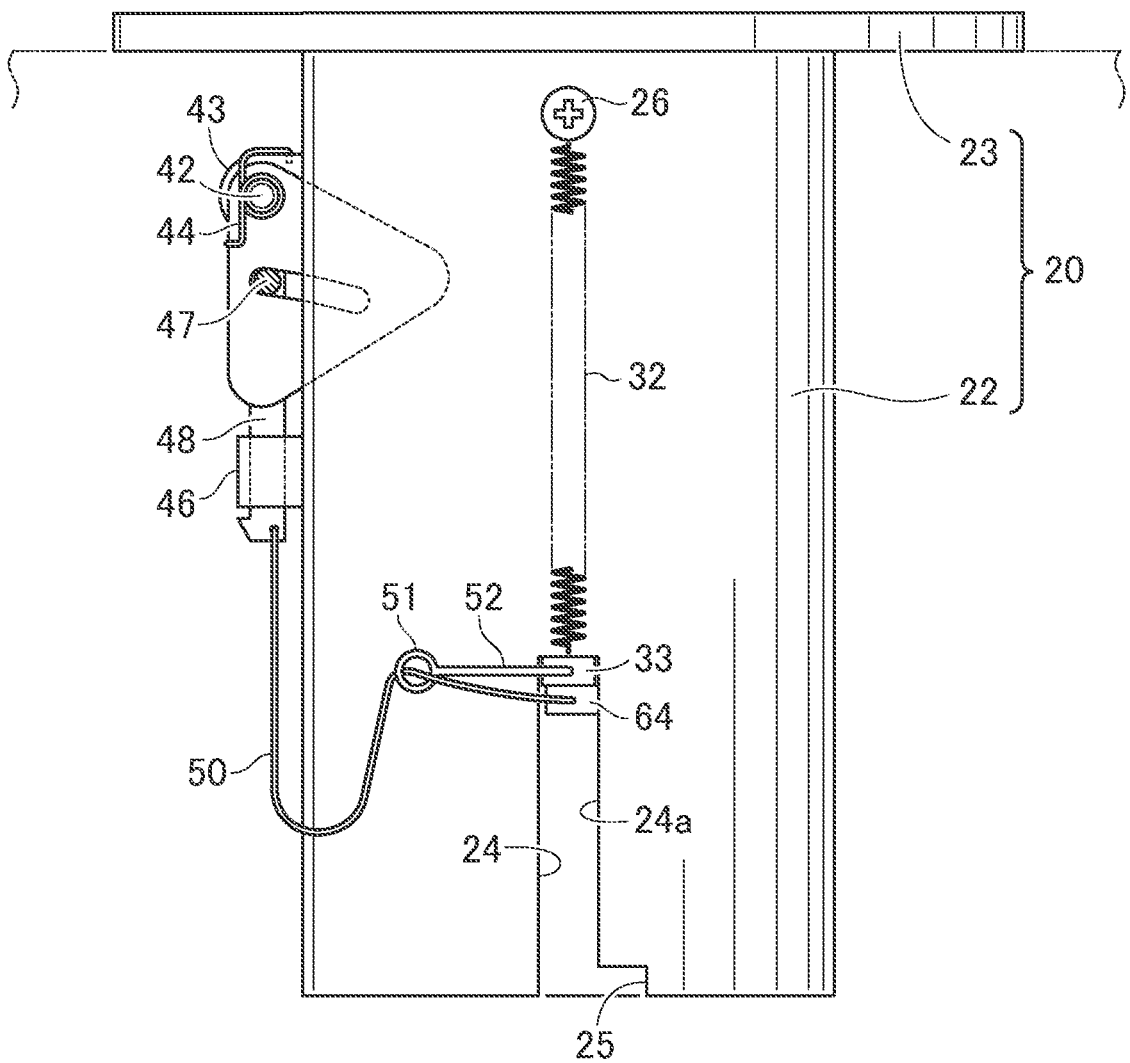

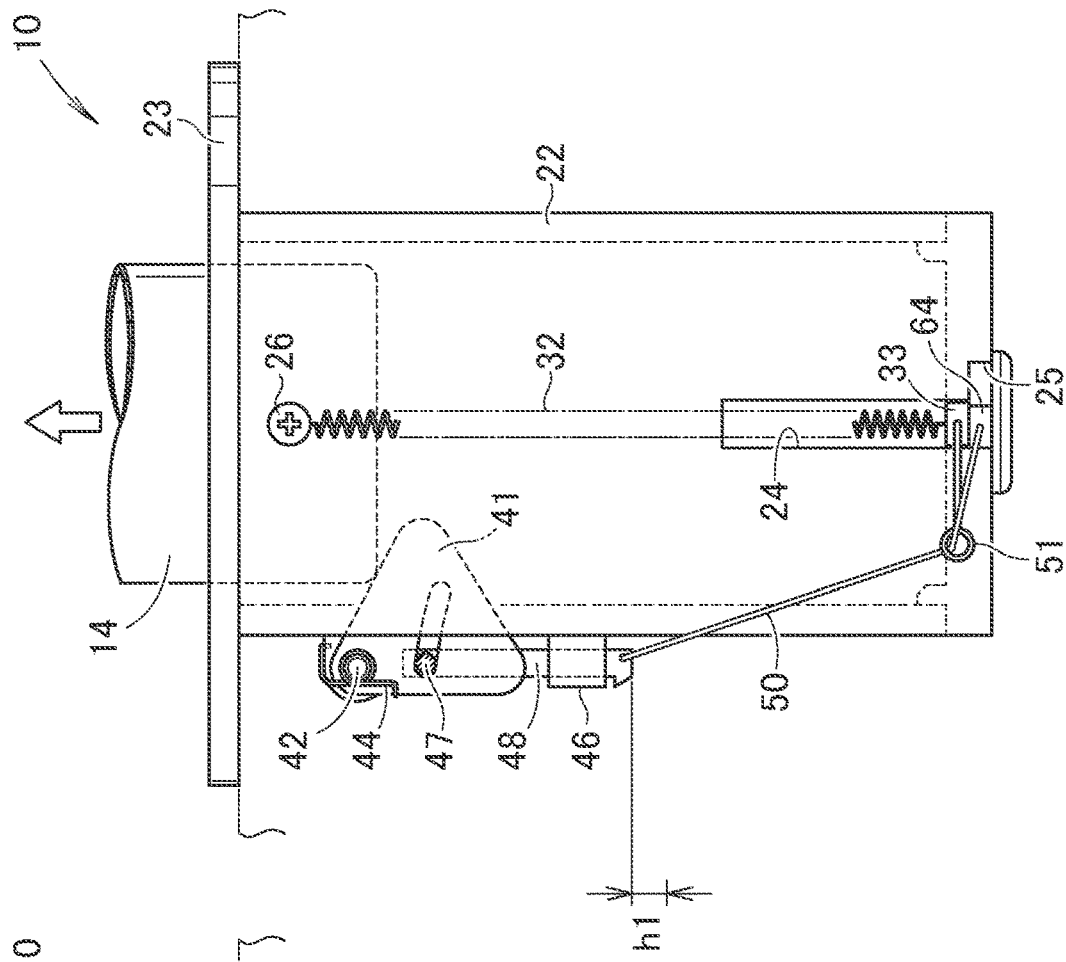
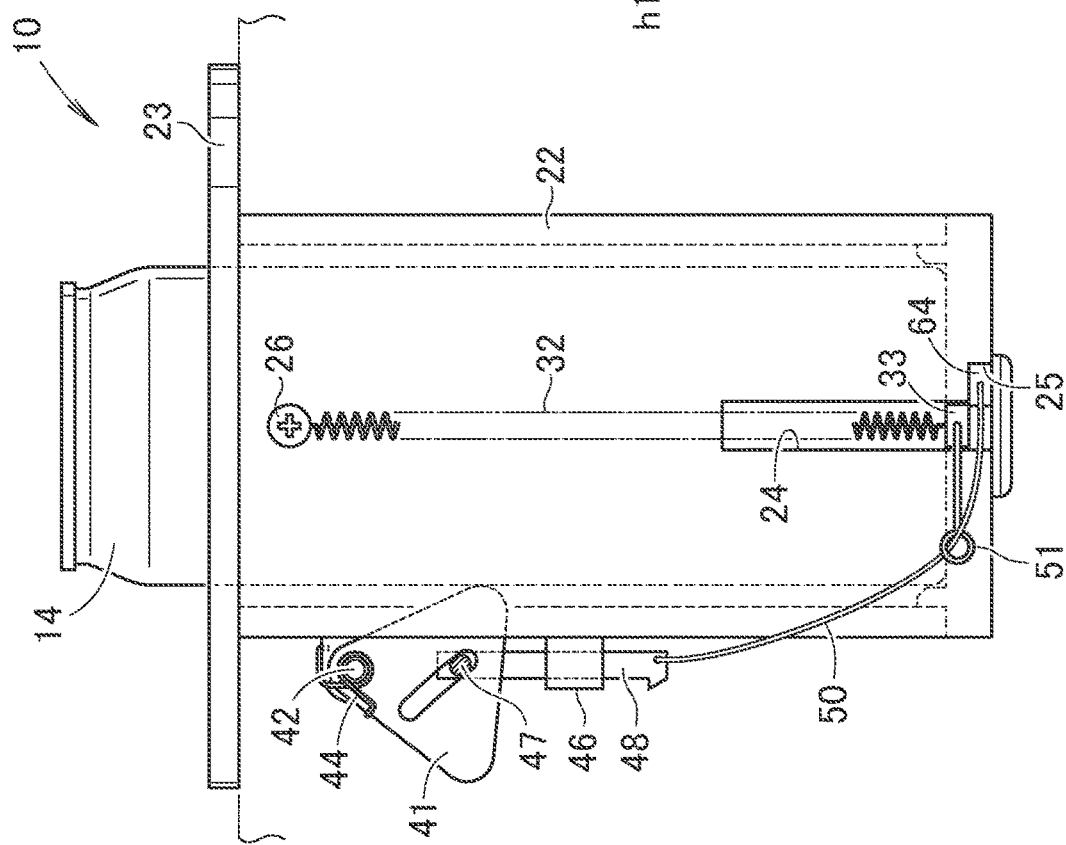

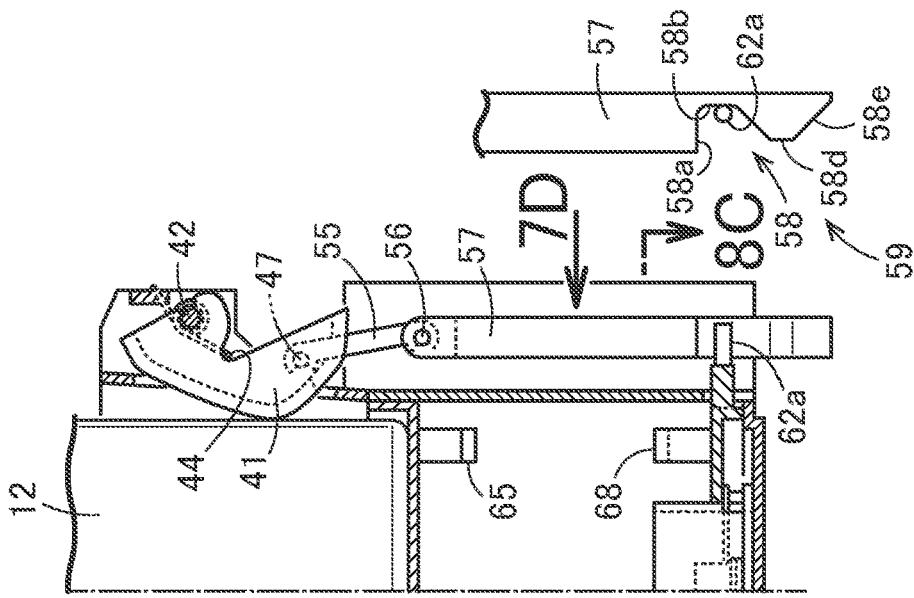
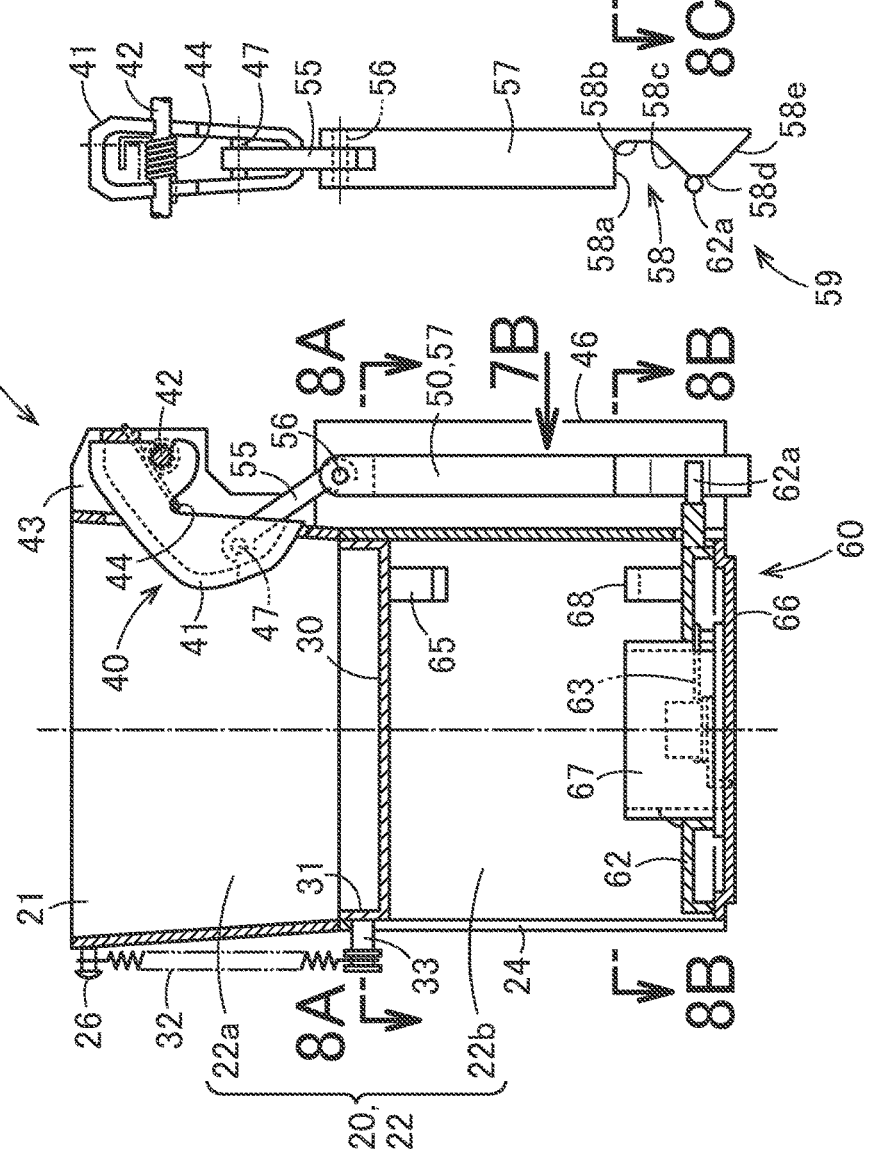

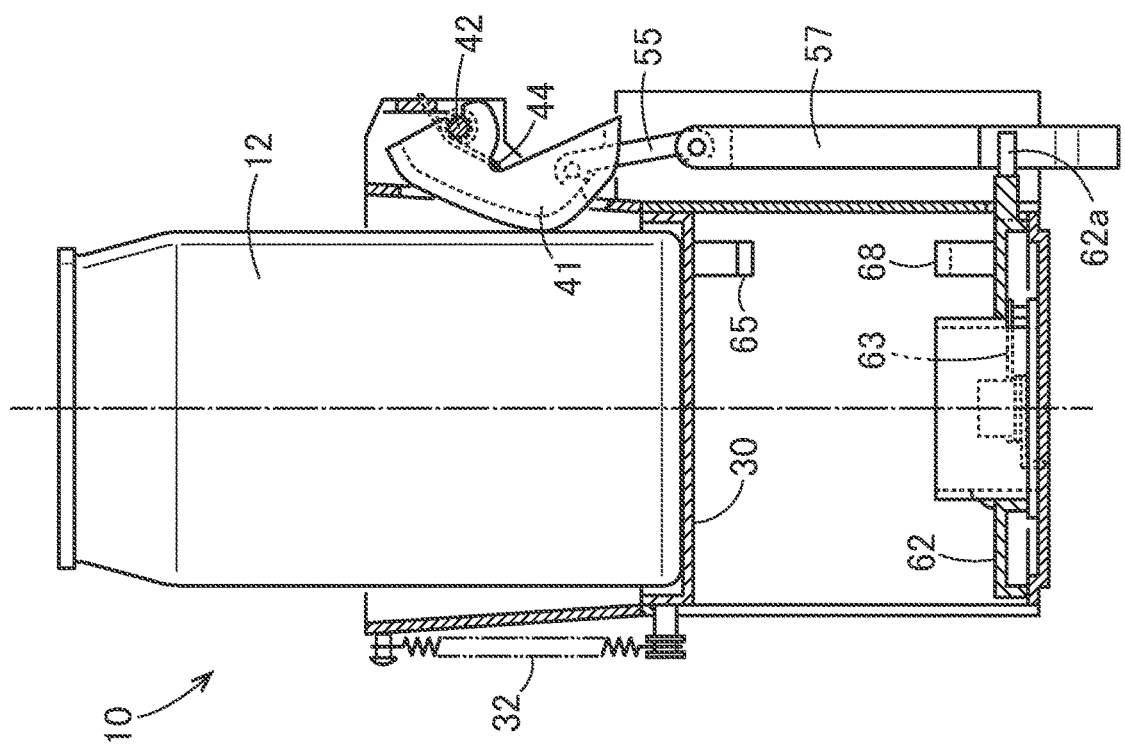
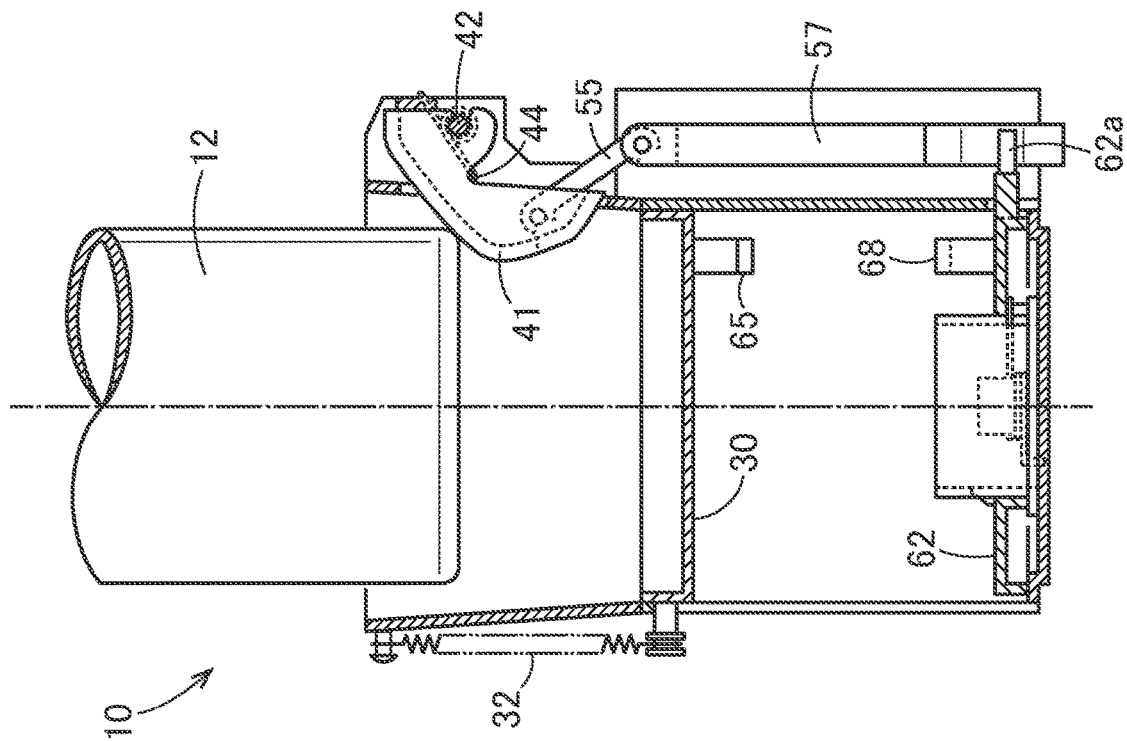

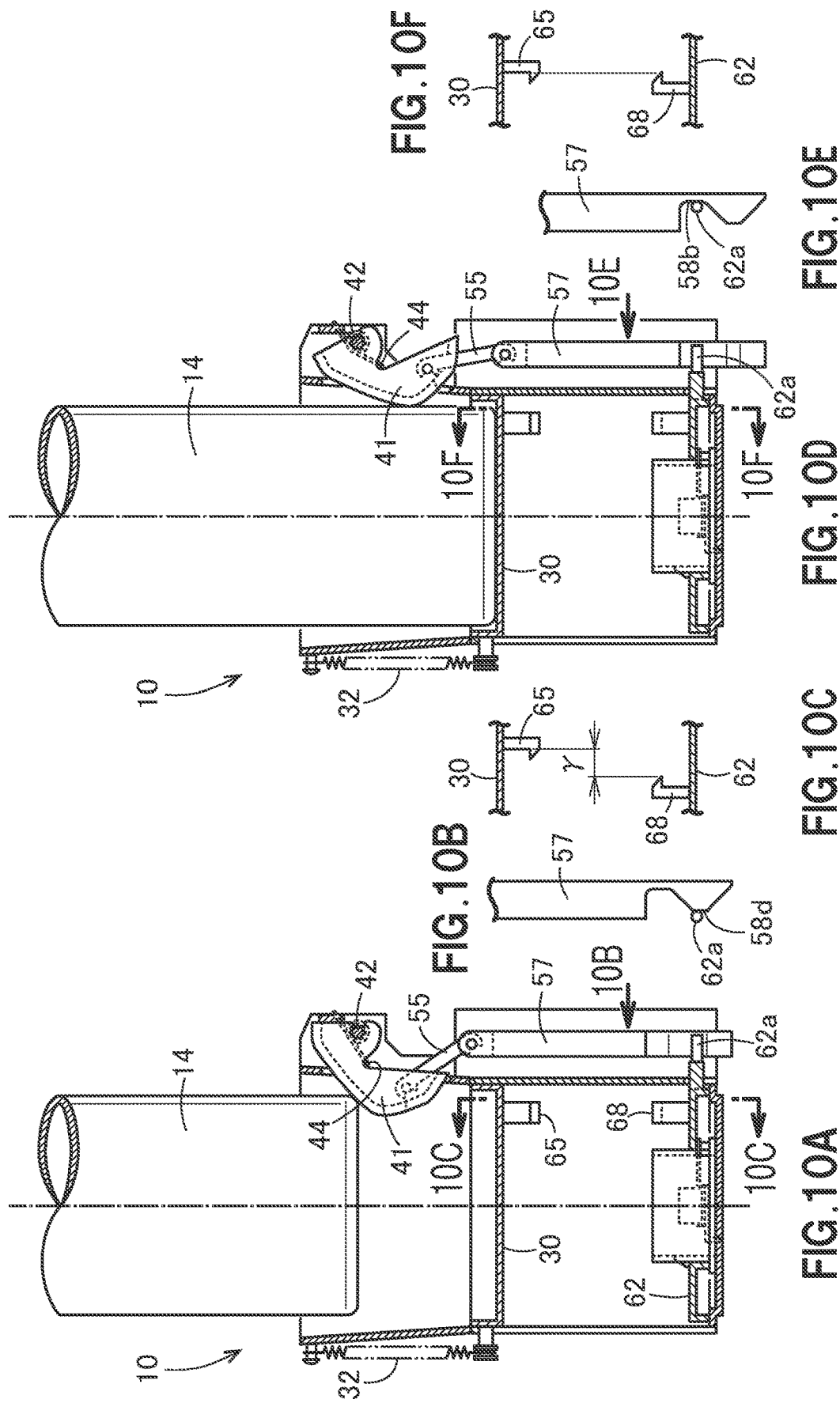

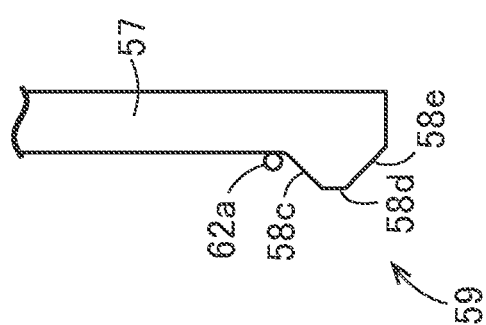
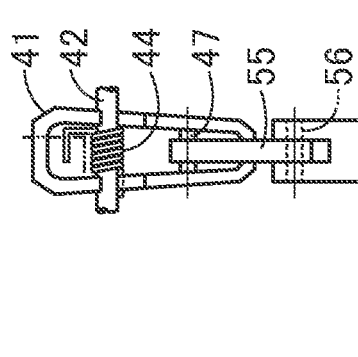
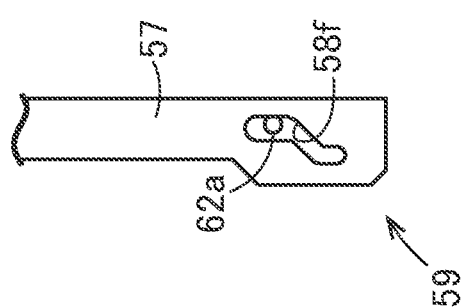
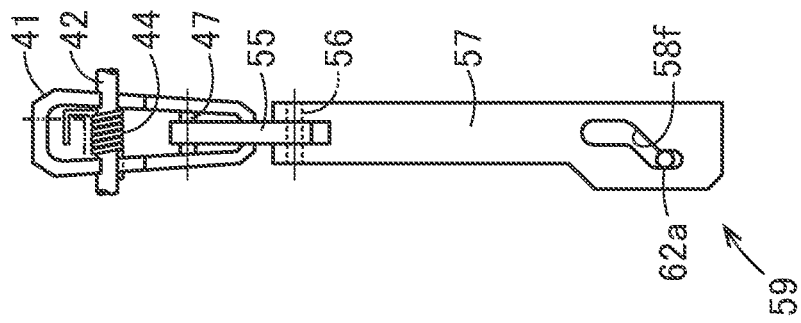

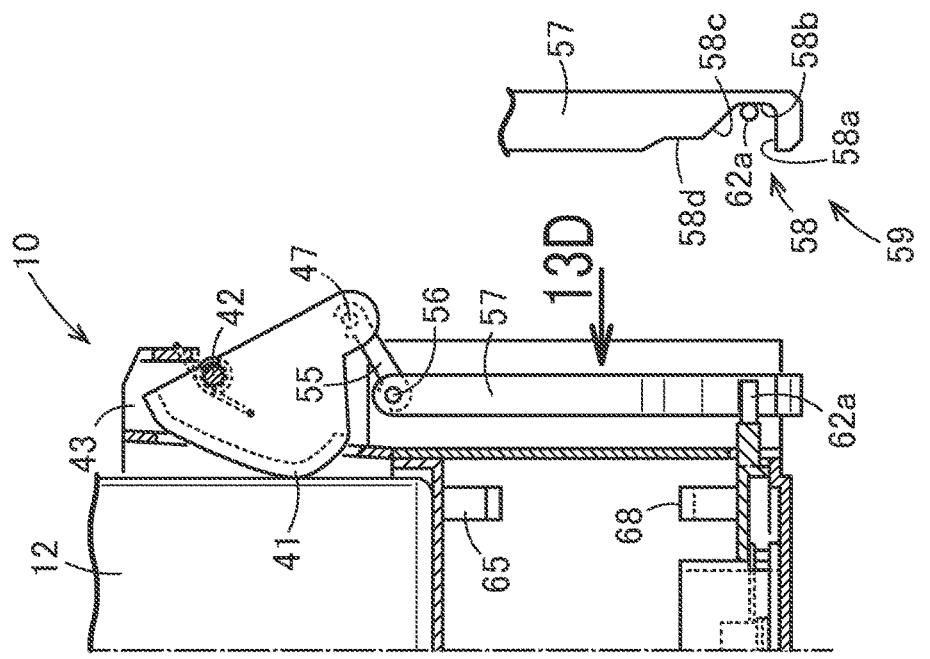
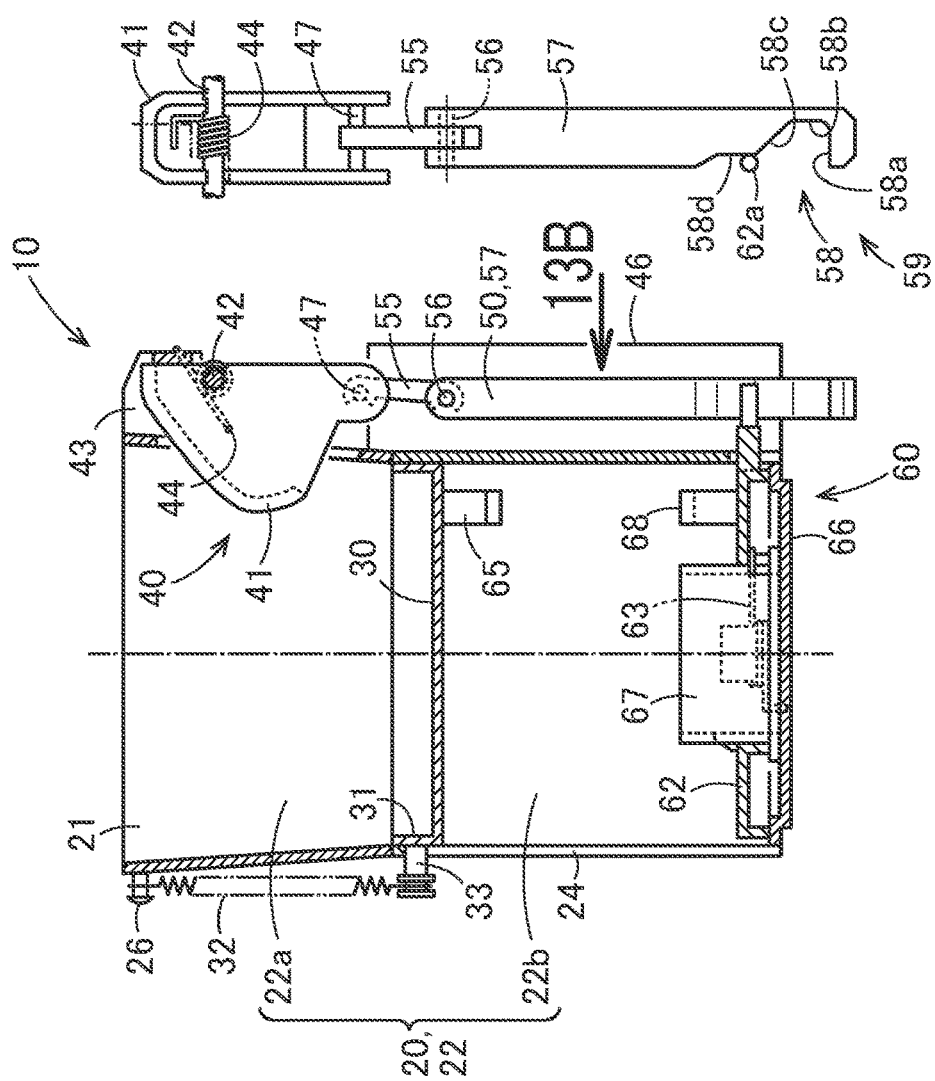

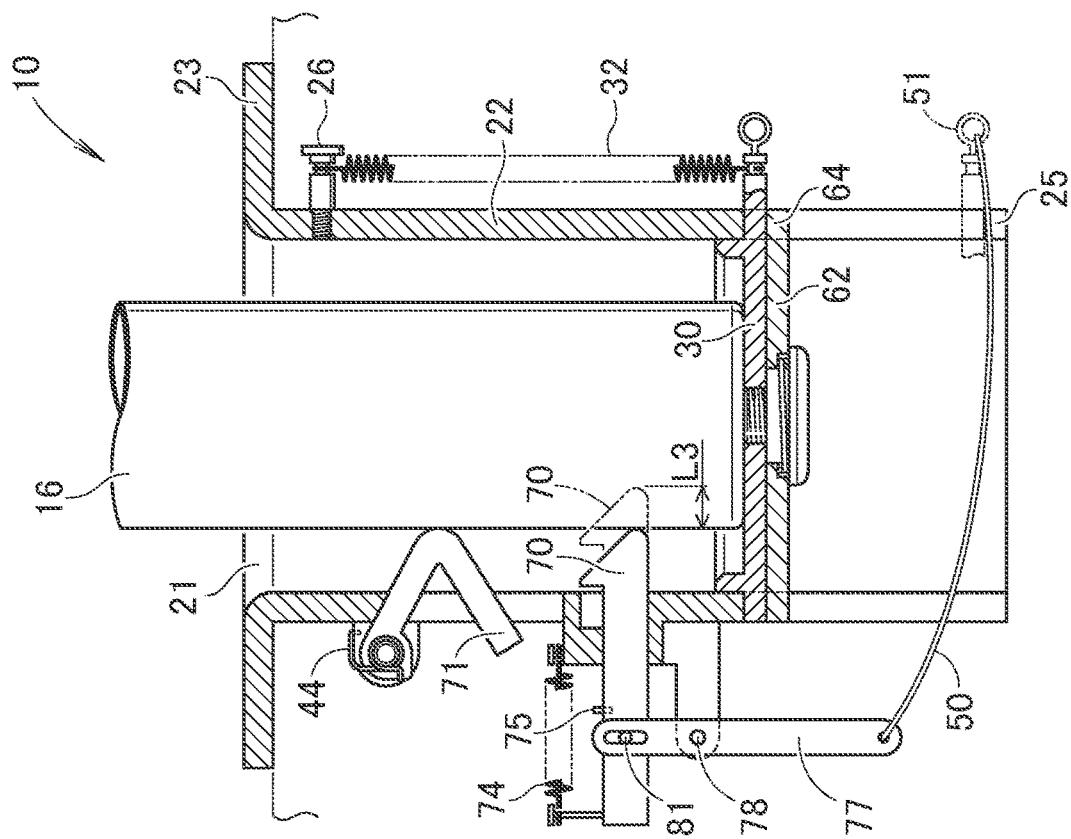
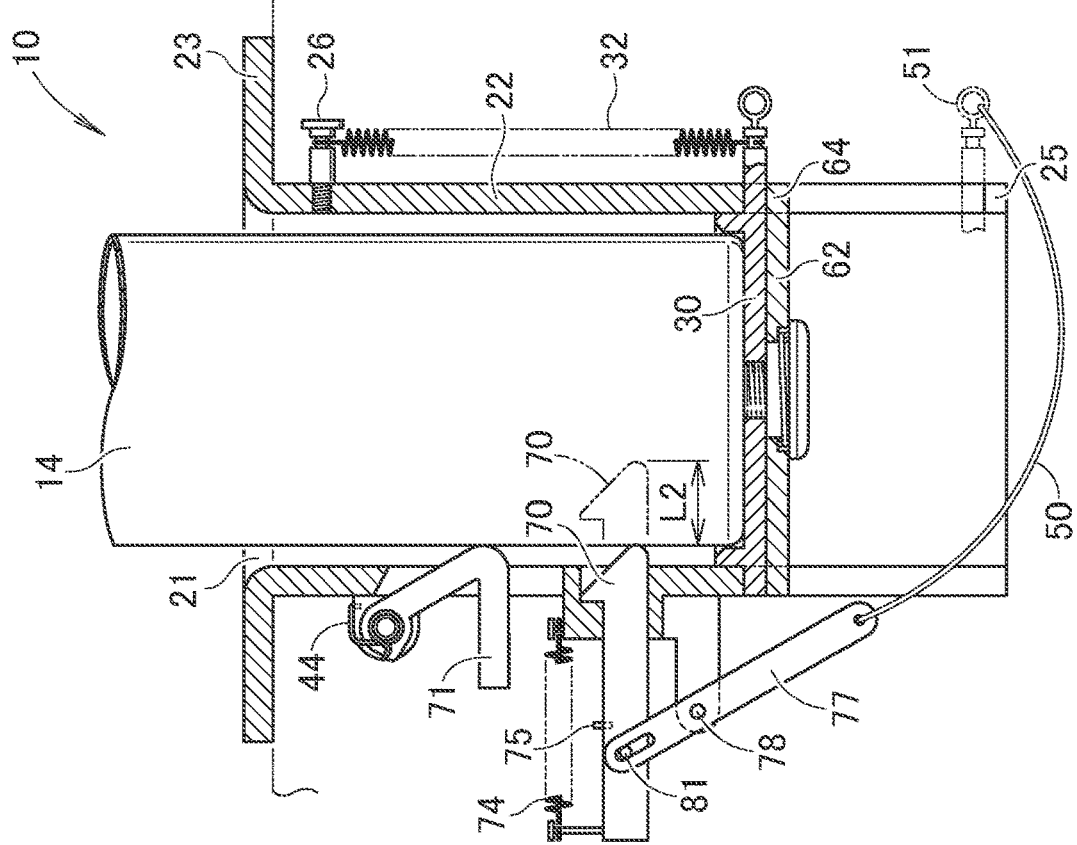

CUP HOLDER

FIELD OF THE INVENTION

The present disclosure relates to a cup holder enabling a stable placement of a beverage container.

BACKGROUND

Vehicles, in particular, passenger automobiles are provided with cup holders at locations where a person in the vehicle can reach. For example, when a beverage container of 350 ml is defined as a regular-size container, and a beverage container of 500 ml is defined as a long-size container, if a cup holder has a depth corresponding to the regular-size container, the long-size container protrudes upwardly and becomes unstable. Moreover, if the cup holder has a depth corresponding to the long-size container, such a depth does not facilitate a pick-up of the regular-size container.

Hence, a cup holder capable of holding beverage containers with different sizes is disclosed in, for example, Japan Patent No. 6071003.

The cup holder disclosed in Japan Patent No. 6071003 includes a tray that supports a beverage container, a protrusion and a first engagement recess which lock the tray at a predetermined position, and an operation member that releases the locking.

The tray is set to either a first position that is a low position and a second position that is a higher position than the first position.

The regular-size container is placed on the tray set to the second position that is a high position.

In the case of the long-size container, the long-size container is placed on the tray at the second position. Next, the long-size container is pushed down. This push-down causes the tray to reach the first position that is a low position.

At the first position that is a low position, engagement of the protrusion with the first engagement recess locks the tray at the first position.

The locking is released by pushing down the operation member.

Such a push-down actuation to the operation member is cumbersome. In particular, when a vehicle is running in night, since the interior of a vehicle is dark, the location of the small operation member is not found easily. Even if the location is found, the push-down actuation to the operation member is bothersome.

In view of a desire for convenience, a cup holder compatible with a change in size of a beverage container without an actuation to the operation member has been desired.

SUMMARY OF THE INVENTION

An objective of the present disclosure is to provide a cup holder compatible with a change in size of a beverage container without an actuation to an operation member.

A cup holder according to a first embodiment of the present disclosure comprises:

a holding member which has an upper surface where an opening is formed and which holds a beverage container that is fitted in from the opening;

a movable plate which is attached to the holding member so as to be movable up and down and which supports the bottom of the beverage container; and a container catching member which is provided at the holding member and which elastically catches the beverage container placed on the movable plate, wherein:

a locking mechanism that causes the movable plate not to be movable up and down is provided between the movable plate and the holding member; and the cup holder further comprises a coupling member that transmits an actuation of the container catching member to the locking mechanism in such a way that when the container catching member is catching the beverage container, the locking mechanism becomes a locking condition, and when the container catching member does not catch the beverage container, the locking mechanism becomes an unlocking condition.

According to the present disclosure, since the movable plate moves up and down, beverage containers with different sizes can be held at an appropriate attitude.

Moreover, when the long-size container is pulled up from the holding member, the container catching member automatically moves in the cylindrical portion. Such a movement is transmitted to the locking mechanism via the coupling member, and the locking of the movable plate is released (unlocked). This unlocking causes the movable plate to automatically return to the position corresponding to the regular-size container.

That is, the operation member that is an essential component according to conventional technologies becomes unnecessary. The locking condition and the unlocking condition can be achieved when a user simply pulls up and down the beverage container.

According to the present disclosure, a cup holder is provided which is compatible with a change in size of a beverage container without an actuation to an operation member.

Preferably, the locking mechanism comprises: a rotation plate provided at the bottom of the holding member so as to be freely rotatable; a lower hook that extends upwardly from the rotation plate; and an upper hook that extends downwardly from the movable plate;

the coupling member is a control rod that moves up and down in accordance with the actuation of the container catching member; and the control rod comprises a rotation plate actuator that converts a vertical movement into a horizontal movement to rotate the rotation plate.

As described above, the control rod that moves up and down is employed as the major component of the coupling member.

The actuation of the container catching member is transmitted to the locking mechanism via the control rod. The control rod can be disposed vertically along the holding member. This vertical disposition enables a downsizing of the cup holder.

Moreover, since the control rod is a rigid body, an unnecessary play (gap) at the connection portion between the control rod and the container catching member, and at the connection portion between the control rod and the locking mechanism is not likely to occur. Since vibration due to an unnecessary play is not likely to be produced, noises due to such an unnecessary play is suppressed. Even if noises are produced, such noises are reduced noises.

Moreover, according to the present disclosure, the upper hook and the lower hook are employed as the major components of the locking mechanism. The lower hook is engaged with the upper hook to achieve the locking condition. Since the engagement between the hooks is firm, the locking is not likely to be released by vibration, etc.

Meanwhile, the rotation plate that is a major component of the locking mechanism can be provided at the movable plate or also at the holding member.

According to the present disclosure, the rotation plate is provided at the holding member different from the movable plate. Since the movable plate is supported by the holding member, the movable plate becomes lightweight by what corresponds to such a supporting structure. The coil spring that pushes the movable plate upwardly can have a small spring constant. When the spring constant is small, the movable plate can be manually pushed down by little force, and thus the actuation to the cup holder becomes easy.

Preferably, the coupling member is a string member.

In the case of the string member, the coupling member can be lightweight and inexpensive, achieving a weight saving of the cup holder and a cost down thereof.

A cup holder according to a second embodiment of the present disclosure comprises:

a holding member which comprises a cylindrical portion that has an upper surface where an opening is formed and which holds a beverage container that is fitted in from the opening;

a movable plate which is attached to the holding member so as to be movable up and down and which supports the bottom of the beverage container; and a container catching member which is provided at the holding member and which elastically catches the beverage container placed on the movable plate; and a driver which is attached to the holding member so as to be horizontally movable and which has a tip configured to advance into the cylindrical portion, wherein:

a locking mechanism that causes the movable plate not to be movable up and down is provided between the movable plate and the holding member; and the cup holder further comprises a coupling member that transmits an actuation of the driver to the locking mechanism in such a way that when the driver is being pushed by the beverage container, the locking mechanism becomes a locking condition, and when the driver is not pushed by the beverage container, the locking mechanism becomes an unlocking condition.

According to the present disclosure, the driver is provided separately from the container catching member.

When the long-size container is pulled up from the holding member, the driver automatically moves in the cylindrical portion. Such a movement is transmitted to the locking mechanism via the coupling member, and the locking of the movable plate is released (unlocked). This unlocking causes the movable plate to automatically return to the position corresponding to the regular-size container.

According to the present disclosure, a cup holder is provided which is compatible with a change in size of a beverage container without an actuation to an operation member.

Moreover, since the driver is provided separately from the container catching member, the container catching member may simply have a function of catching the container, and thus the structure can be simplified.

Preferably, when the driver is not pushed by the beverage container, a tip of the driver advances in the cylindrical portion beyond the container catching member.

According to the present disclosure, even if the beverage container is a slim-size container with a small diameter that does not enable the container catching member to catch, the locking condition and the unlocking condition are achievable.

That is, according to the present disclosure, a cup holder capable of holding also the slim-size container in addition to the long-size container and to the regular-size container is provided.

BRIEF DESCRIPTION OF THE DRAWINGS

Several preferable embodiments of the present disclosure will be described below in detail with reference to the accompanying drawings in which:

FIG. 1 is a cross-sectional view of a cup holder according to the present disclosure;

FIG. 3A is an explanatory diagram for a configuration when a beverage container is fitted;

FIG. 3B is an explanatory diagram for a configuration after the beverage container is fitted;

FIG. 4 is a side view of the cup holder;

FIG. 6A is an explanatory diagram for a configuration before a locking is released;

FIG. 6B is an explanatory diagram for a configuration after the locking is released;

FIG. 7A is a cross-sectional view of the cup holder according to a modified example of the present disclosure;

FIG. 7B is a diagram as viewed along an arrow 7B in FIG. 7A;

FIG. 7C is an explanatory diagram for a configuration when a cam plate is pushed by a beverage container;

FIG. 7D is a diagram as viewed along an arrow 7D in FIG. 7C;

FIG. 9A is an explanatory diagram for a configuration when a regular-size container is held;

FIG. 9B is an explanatory diagram for a configuration after the regular-size container is held;

FIG. 10A is an explanatory diagram for a configuration when a long-size container is held;

FIG. 10B is a diagram as viewed along an arrow 10B in FIG. 10A;

FIG. 10C is a cross-sectional view taken along a line 10C-10C in FIG. 10A;

FIG. 10D is an explanatory diagram for a configuration when the long-size container is held partially;

FIG. 10E is a diagram as viewed along an arrow 10E in FIG. 10D;

FIG. 10F is a cross-sectional view taken along a line 10F-10F in FIG. 10D;

FIGS. 12A, 12B, 12C, and 12D are explanatory diagrams for a modified example of a rotation plate actuator;

FIGS. 13A and 13C are explanatory diagrams for a further modified example of the rotation plate actuator;

FIG. 13B is a diagram as viewed along an arrow 13B in FIG. 13A;

FIG. 13D is a diagram as viewed along an arrow 13D in FIG. 13C;

FIGS. 15A and 15B are explanatory diagrams for an action of the cup holder illustrated in FIG. 14.

DETAILED DESCRIPTION OF THE EMBODIMENTS

Figure 2A:
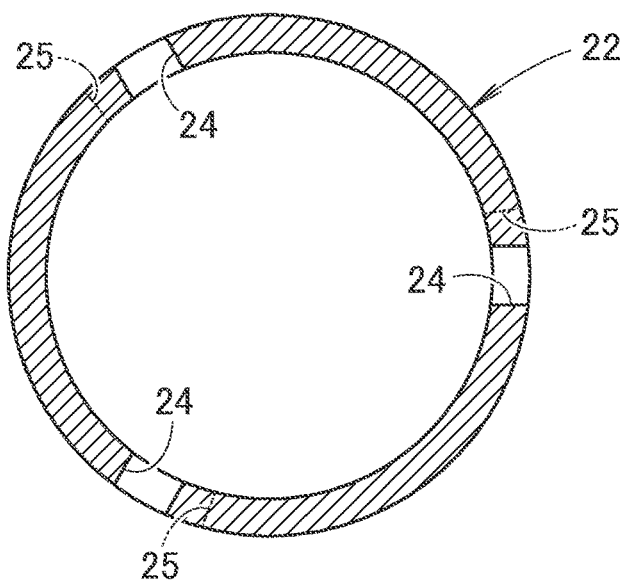
FIG. 2A is a cross-sectional view taken along a line 2A-2A in FIG. 1.

As illustrated in FIG. 1, a cup holder 10 includes a holding member 20 which has an upper surface where an opening 21 is formed and which holds a beverage container that is fitted in from the opening 21, a movable plate 30 which is attached to the holding member 20 so as to be movable up and down and which supports the bottom of the beverage container, and a container catching member 40 which is provided at the holding member 20 and which elastically catches the side surface of the beverage container placed on the movable plate 30.

The holding member 20 includes, for example, a cylindrical portion 22 that has a one-size larger diameter than that of the beverage container, and a flange portion 23 formed integrally with an upper end of the cylindrical portion 22. The shape of the flange portion 23 is optional, and the flange portion may be omitted as appropriate.

The cylindrical portion 22 has a guide groove 24 that extends linearly at a lower part, and includes a locking recess 25 concaved in the depthwise direction of a plane of the figure at the lower end of the guide groove 24.

The movable plate 30 includes a ring wall 31 that surrounds the bottom of the beverage container on an upper surface, and is pushed upwardly by a pushing member like a coil spring 32. The coil spring 32 may be an extension spring, a compression spring, a torsion spring or a rubber string. In fact, the pushing member is not limited to any particular member as long as it has an action of pushing the movable plate 30 upwardly. The ring wall 31 may be omitted as appropriate.

An end (upper end) of the coil spring 32 may be directly attached to the flange portion 23, but it is desirable that such an upper end should be attached to the cylindrical portion 22 via a pin 26 like the embodiment. This is because the pin 26 facilitates a change in attaching position (height position).

Moreover, a locking mechanism 60 is provided between the movable plate 30 and the cylindrical portion 22.

The locking mechanism 60 includes, for example, a rotation plate 62 which is laid over on the lower surface of the movable plate 30 and which is fastened to the movable plate 30 so as to be freely rotatable by, for example, a large-diameter screw 61, a first torsion spring 63 that pushes this rotation plate 62 in a predetermined direction, at least one locking pawl 64 that locally protrudes from the outer circumference surface of the rotation plate 62, and the locking recess 25 provided in the cylindrical portion 22. The number of the locking recesses 25 corresponds to the number of the locking pawls 64, and at least one locking recess is formed.

The container catching member 40 includes, for example, a cam plate 41 in a substantially triangular shape, a first pin 42 that supports the cam plate 41 so as to be freely rotatable, a bracket 43 that extends from the cylindrical portion 22, a second torsion spring 44 which is tensioned between the bracket 43 and the cam plate 41 and which pushes the cam plate 41 toward the center of the cylindrical portion 22, a cam groove 45 in a circular arc or linear shape integrally formed in the cam plate 41, a guide cylinder 46 provided at the cylindrical portion 22, and a rod 48 which is guided by the guide cylinder 46 so as to be movable up and down and which has an upper end coupled to the cam groove 45 via a second pin 47.

The cam plate 41 may be a solid plate, a hollow member, etc.

Preferably, a stopper piece 49 which abuts the guide cylinder 46 and which restricts the upper limit of the rod 48 is provided at the lower part of the rod 48. However, the stopper piece 49 is not always necessary.

Moreover, an end of a coupling member 50 is fastened to the lower part of the rod 48.

The kind and structure of the coupling member 50 are not limited to any particular ones as long as it mechanically couples two elements (in this embodiment, the rod 48 and the locking pawl 64), and in this embodiment, a string member is employed. This is because the string member is lightweight and inexpensive. Preferable string members are a resin thread like gut, a metal wire like a piano wire, and a decoration chain. The resin thread, the metal wire, and the chain have excellent flexibility, and are not likely to change the length when pulled.

As illustrated in FIG. 2A, the cylindrical portion 22 includes at least one (in this embodiment, three at 120-degree pitch) guide groove 24. Each guide groove 24 includes the locking recess 25.

Figure 2B:
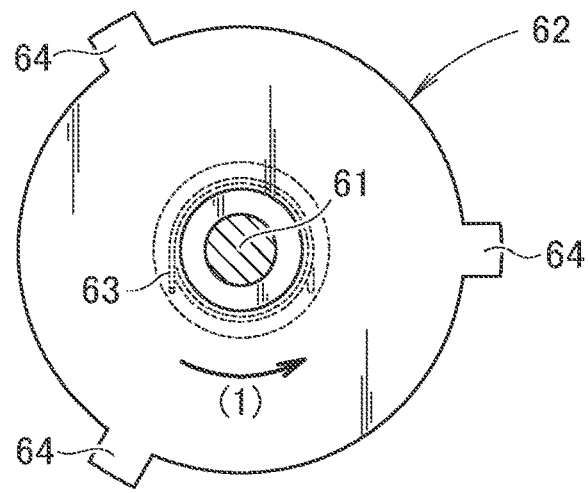
FIG. 2B is a cross-sectional view taken along a line 2B-2B in FIG. 1.

As illustrated in FIG. 2B, the rotation plate 62 includes at least one (in this embodiment, three at 120-degree pitch) locking pawl 64. This locking pawl 64 is to be engaged with the guide groove 24 and also the locking recess 25. Moreover, the rotation plate 62 is pushed by the first torsion spring 63 in the counterclockwise direction around the large-diameter screw 61 in a planar view as indicated by an arrow (1).

Figure 2C:
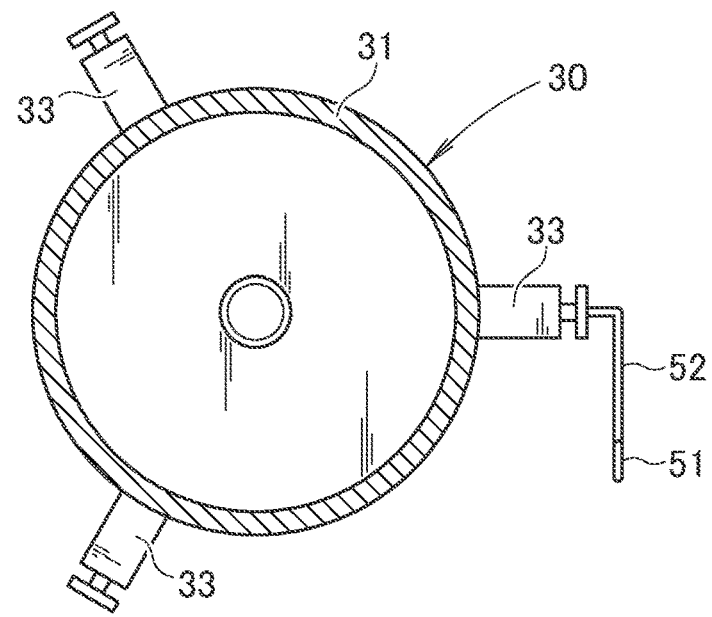
FIG. 2C is a cross-sectional view taken along a line 2C-2C in FIG. 1.

As illustrated in FIG. 2C, the movable plate 30 includes at least one (in this embodiment, three at 120-degree pitch) protrusion 33. This protrusion 33 is engaged with the guide groove 24. Moreover, the other end of the coil spring (see FIG. 1, reference numeral 32) is engaged with the protrusion 33.

The cup holder 10 illustrated in FIG. 1 is in an empty condition (a configuration in which no beverage container is held, i.e., a standby condition).

The configuration when a beverage container is fitted in this cup holder 10 will be described.

As illustrated in FIG. 3A, a regular-size container 12 that is a kind of a beverage container is fitted in the cylindrical portion 22 via the opening 21. In this case, the bottom of the regular-size container 12 contacts the cam plate 41. When the regular-size container 12 is further pushed down, the cam plate 41 starts rotating in the clockwise direction in the figure around the first pin 42. The rotation of the cam plate 41 in the clockwise direction causes the cam groove 45 to start pushing down the rod 48 via the second pin 47.

Consequently, as illustrated in FIG. 3B, the rod 48 is moved down by h1 in comparison with FIG. 3A.

The cam plate 41 is being pushed in the counterclockwise direction in the figure by the second torsion spring 44. Such a cam plate 41 catches the side face of the regular-size container 12, eliminating a shaking of the regular-size container.

In FIG. 3B, the weight of the regular-size container 12 is applied to the movable plate 30. The movable plate 30 is pushed upwardly by the coil spring 32, etc., and is not pushed down by merely the regular-size container 12. That is, the spring characteristics of the coil spring 32 is set so as not to cause the movable plate 30 to move down.

When the regular-size container 12 is lifted up from the configuration in FIG. 3B, it returns to the configuration in FIG. 3A. Accordingly, when the regular-size container 12 is to be held, it becomes the configuration in either FIG. 3A or FIG. 3B, facilitating the put-in and pick-up of the regular-size container 12.

As illustrated in FIG. 4, the protrusions 33 pushed upwardly by the respective coil springs 32 contact and are stopped by the upper ends of the respective guide groove 24 that extend in the vertical direction.

The locking pawls 64 move up and down together with the respective protrusions 33. Since the locking pawls 64 are pushed by the first torsion spring (see FIG. 2B, reference numeral 63), those are in contact with one walls 24a (a wall 24a at the locking-recess-25 side) of the respective guide groove 24.

Moreover, the coupling member 50 that couples the rod 48 to the locking pawl 64 is sufficiently un-tensioned.

Preferably, the protrusion 33 is provided with a guide member 52 in an antenna shape. The guide member 52 projects horizontally toward the rod-48 side, and includes a guide ring 51 at a tip. This guide ring 51 has a function of guiding the coupling member 50.

This guide member 52 allows the part of the coupling member 50 near the locking pawl 64 to be substantially horizontal, enabling an efficient retraction of the locking pawl 64 toward the unlocking side.

However, the guide member 52 may be omitted. Alternatively, the guide member 52 may be in other shapes and may employ other structures.

An action of the cup holder 10 that employs the above-described structure will be described below.

Figure 5A:
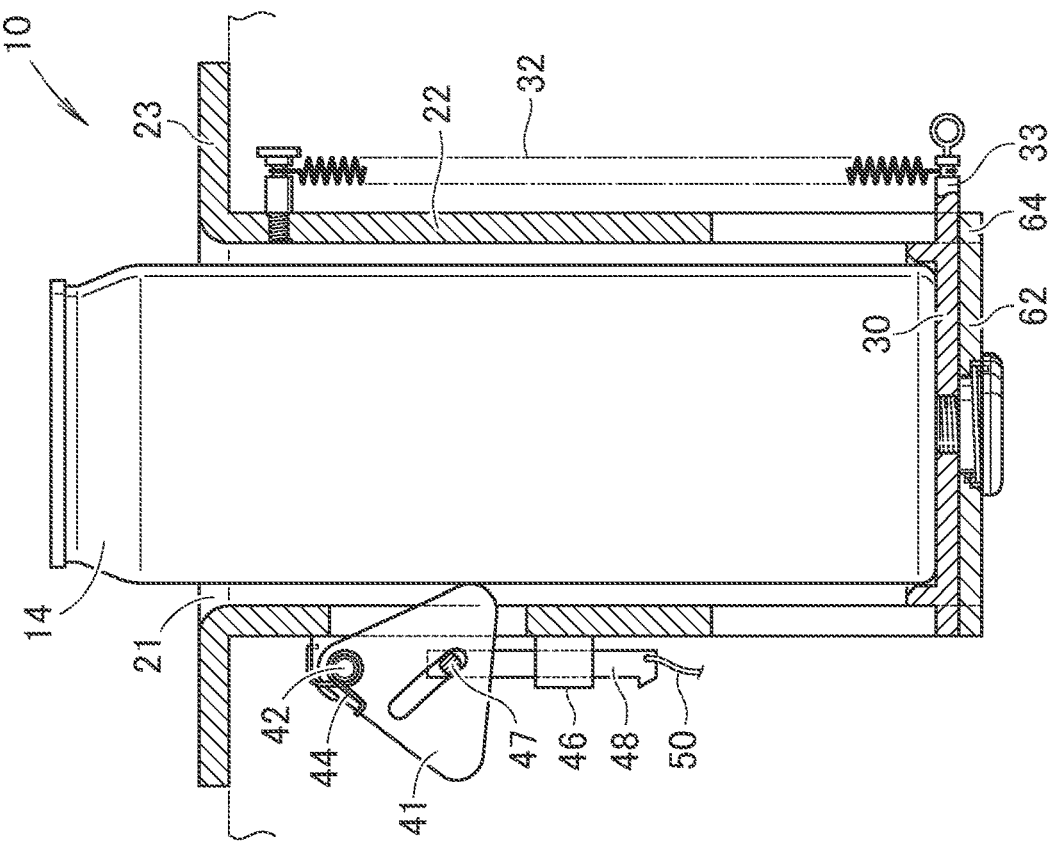
FIG. 5A is an explanatory diagram for a configuration when a long-size container is held.

As illustrated in FIG. 5A, a long-size container 14 is fitted in the cylindrical portion 22 from the upper opening 21. The long-size container 14 is placed on the movable plate 30. Since the movable plate 30 is pushed upwardly by the coil spring 32, the movable plate 30 is not pushed down.

However, since the long-size container 14 greatly protrudes upwardly, the long-size container 14 is unstable.

Hence, a user (a person in a vehicle) pushes down the long-size container 14 by hand.

Figure 5B:
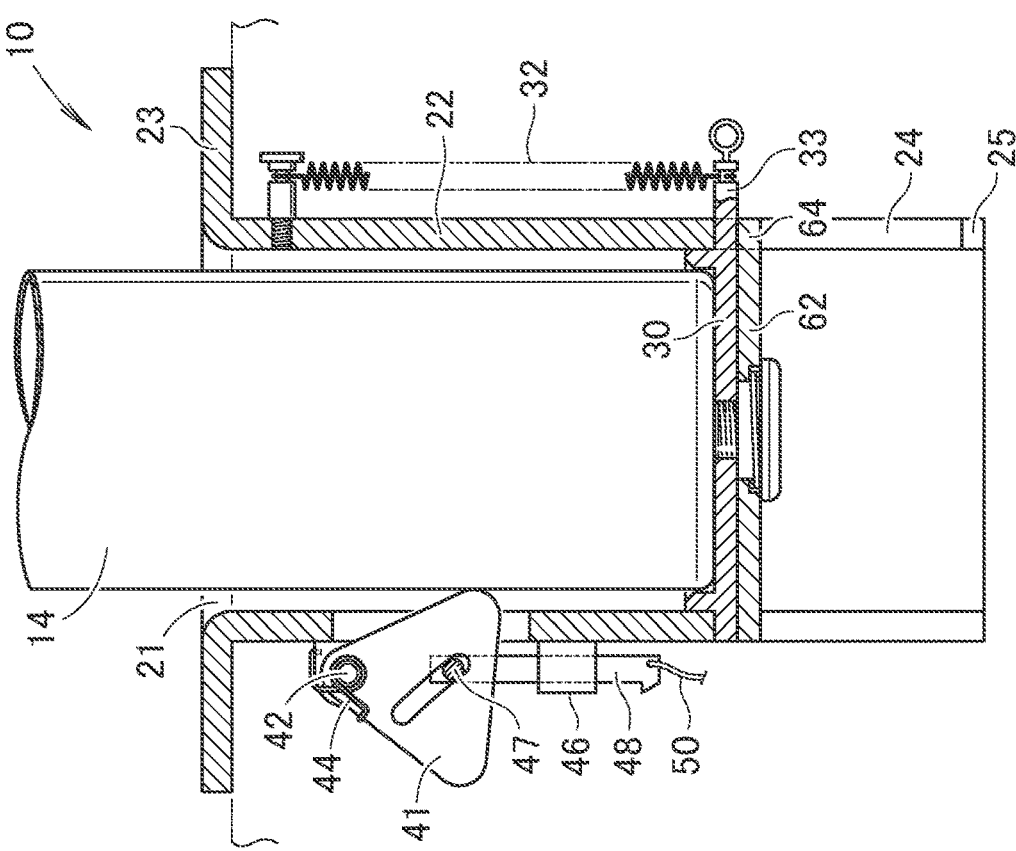
FIG. 5B is an explanatory diagram for a configuration after the long-size container is held.

In this case, as illustrated in FIG. 5B, the movable plate 30 is moved down against the pushing force by the coil spring 32.

As illustrated in FIG. 6A, when the protrusions 33 and the locking pawls 64 are moved down to predetermined positions, the respective locking pawls 64 are engaged with the respective locking recesses 25. It becomes the locking condition, and the long-size container 14 does not move up even a hand is released. At this time, the coupling member 50 is slightly un-tensioned.

Next, when the user (the person in the vehicle) lifts the long-size container 14 by hand for drinking, etc., this long-size container 14 is lifted up while sliding and contacting the cam plate 41. During this action, the locking condition is maintained, and the locking pawls 64 and the protrusions 33 remain at the lower ends of the respective guide grooves 24.

When the bottom of the long-size container 14 passes through the cam plate 41, as illustrated in the FIG. 3B to FIG. 3A, the cam plate 41 rotates in the counterclockwise direction in the figure. This rotation causes the rod 48 to move up by h1.

As illustrated in FIG. 6B, when the cam plate 41 rotates in the counterclockwise direction, the coupling member 50 becomes tensioned in the first half of the rotation action. The respective locking pawls 64 are pulled in the direction away from the respective locking recesses 25 in the second half of the rotation action.

Consequently, the respective locking pawls 64 are separated from the respective locking recesses 25, and the cup holder becomes an unlocking condition.

As for the beverage container 14, there is a container with concavities and convexities or a squeeze on the side surface in addition to a simple circular cylindrical container.

When there are concavities and convexities, etc., on the side surface, the cam plate 41 slightly rotates in the counterclockwise direction. However, this rotation is stopped in the intermediate configuration between FIG. 6A and FIG. 6B.

Since the cam plate 41 does not becomes the configuration in FIG. 6B, the locking condition is maintained even if the container is in a shape having concavities and convexities, etc., on the side surface.

In FIG. 6A, even if the beverage container 14 has concavities and convexities on the side surface or a squeeze thereon, the locking condition is maintained and the beverage container 14 does not bounce due to the action of the coil spring 32. That is, even if it is in an unusual shape, the beverage container 14 can be held stably.

The unlocking condition illustrated in FIG. 6B is maintained unless the cam plate 41 is rotated by the long-size container 14 (or the regular-size container 12).

In the unlocking condition, the pushing force of the coil spring 32 moves up the protrusions 33 and the locking pawls 64 in the guide groove 24, and the configuration returns to FIG. 4.

The user simply needs to lift up and down the long-size container 14.

According to the present disclosure, the cup holder 10 is provided which is compatible with a change in size of a beverage container without an actuation to an operating member like a push button.

Next, modified examples of the present disclosure will be described below.

The cup holder 10 illustrated in FIG. 7A has an improvement to the coupling member 50 and to the locking mechanism 60 illustrated in FIG. 1. The details of such an improvement will be described in detail below. Other components are common to those in FIG. 1, and thus the common components as those in FIG. 1 will be denoted by the same reference numerals, and the detailed description thereof will be omitted.

As illustrated in FIG. 7A, in this modified example, the cylindrical portion 22 that has an upper surface where the opening 21 is formed has the upper half that is a tapered tubular portion 22a which is wide open upwardly, and has the lower half as a circular cylindrical portion 22b. The tapered tubular portion 22a and the circular cylindrical portion 22b may be formed integrally with each other, or may be separately produced and then combined with each other.

Moreover, the pin 26 that catches the one end (upper end) of the coil spring 32 may be a projection formed integrally with the tapered tubular portion 22a. In the case of the integrally-formed projection, it is not necessary to prepare the pin 26, and thus the number of components can be reduced.

The movable plate 30 includes the ring wall 31, and the protrusion 33 protrudes from this ring wall 31. This protrusion 33 catches the other end (lower end) of the coil spring 32.

The movable plate 30 is provided with an upper hook 65 that extends downwardly at the bottom surface.

In the container catching member 40, the cam plate 41 is supported by the bracket 43 via the first pin 42. This cam plate 41 is pushed by the second torsion spring 44 toward the center of the tapered tubular portion 22a.

A link 55 is connected to the lower part of such a cam plate 41 via the second pin 47, and this link 55 is coupled to a control rod 57 that is the coupling member 50 via a third pin 56. Although the link 55 corresponds to the rod 48 illustrated in FIG. 1, since the form is different, the new name and the new reference numeral are given.

Although the guide cylinder 46 includes a guide groove and a rib, the illustration is simplified in this description. That is, the guide cylinder 46 serves as a guide which surrounds the control rod 57 and which guides the control rod 57 so as to be freely movable up and down.

The link 55 is a member that rotates around the second pin 47, and the control rod 57 is a member that moves up and down without a rotation.

The locking mechanism 60 includes a bottom plate 66 fitted to the lower end of the circular cylindrical portion 22b, the rotation plate 62 freely rotatably fitted to a large-diameter cylindrical portion 67 which is integrally formed with this bottom plate 66 and which extends upwardly, a lower hook 68 that extends upwardly from this rotation plate 62, and the first torsion spring 63. The rotation plate 62 is provided with a controlled element 62a which extends to the control rod 57 and which is controlled by this control rod 57. Although a pin is suitable for the controlled element 62a, a projection and a recess are also applicable, and the shape is optional.

As illustrated in FIG. 7B, the cam plate 41 is a hollow body.

Moreover, the control rod 57 includes a rotation plate actuator 59 which changes the vertical movement into the horizontal movement and which rotates the rotation plate 62.

This rotation plate actuator 59 includes a V-shaped notch 58 provided at the lower part of the control rod 57, and a top portion 58d which adjoins to this V-shaped notch 58 and which is provided in the control rod 57.

The V-shaped notch 58 includes a horizontal wall 58a that is substantially horizontal, a bottom 58b continuous to the tip of the horizontal wall 58a, and an inclined wall 58c extending obliquely downwardly from the lower end of the bottom 58b.

Furthermore, the control rod 57 includes the top portion 58d continuous to the lower end of the inclined wall 58c, and a second inclined wall 58e that extends obliquely downwardly in the direction intersecting with the inclined wall 58c from the top portion 58d.

The top portion 58d corresponds to the edge of the V-shaped notch 58. The controlled element 62a is mounted on the top portion 58d.

As illustrated in FIG. 7C, when pushed by the beverage container 12, the cam plate 41 rotates in the counterclockwise direction in the figure. The inclined link 55 changes the attitude in the substantially vertical direction by this rotation. This change pushes down the control rod 57 by a predetermined distance. The predetermined distance corresponds to the gap (vertical distance) between the top portion 58d and the bottom 58b.

As illustrated in FIG. 7D, since the control rod 57 is moved down, the controlled element 62a is in contact with the bottom 58b of the V-shaped notch 58.

Figure 8A:
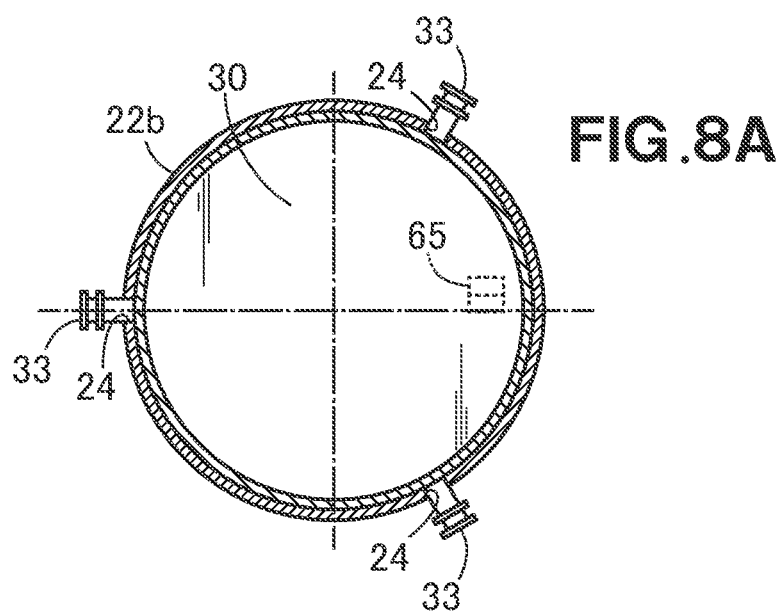
FIG. 8A is a cross-sectional view taken along a line 8A-8A in FIG. 7A.

As illustrated in FIG. 8A, for example, the three protrusions 33 are extended from the movable plate 30. Since the protrusions 33 are engaged with the respective guide grooves 24, the movable plate 30 does not rotate. The number of the upper hooks 65 provided on the movable plate 30 may be one or plural numbers (e.g., three at 120-degree pitch).

Figure 8B:
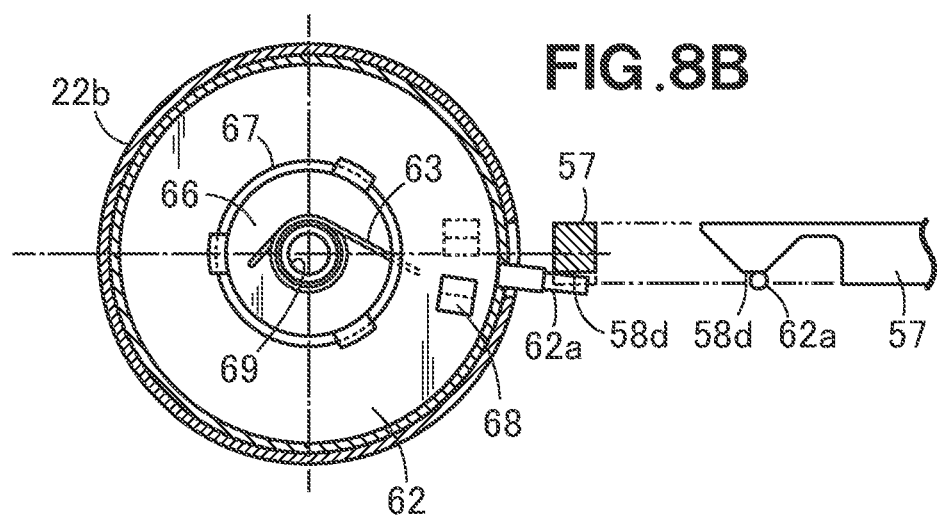
FIG. 8B is a cross-sectional view taken along a line 8B-8B in FIG. 7A.

As illustrated in FIG. 8B, a small-diameter cylindrical portion 69 is provided inwardly relative to the large-diameter cylindrical portion 67, and the first torsion spring 63 is wound around this small-diameter cylindrical portion 69. The small-diameter cylindrical portion 69 may be a solid column.

This first torsion spring 63 has one end attached to the bottom plate 66 (or the large-diameter cylindrical portion 67), and the other end attached to the rotation plate 62.

The first torsion spring 63 pushes the rotation plate 62 in the counterclockwise direction in the figure around the bottom plate 66 (or the large-diameter cylindrical portion 67). This push causes the controlled element 62a to abut the top portion 58d of the control rod 57. That is, the pushing action by the first torsion spring 63 causes the controlled element 62a to be always intimately in contact with the control rod 57.

Figure 8C:
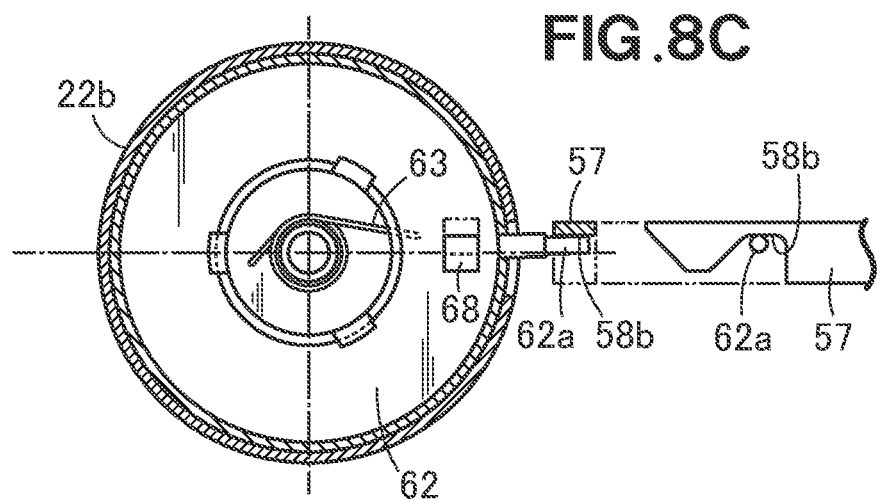
FIG. 8C is a cross-sectional view taken along a line 8C-8C in FIG. 7C.

As illustrated in FIG. 8C, when the controlled element 62a reaches the bottom 58b of the control rod 57, the rotation plate 62 is rotated in the counterclockwise direction in the figure by the difference between the top portion 58d and the bottom 58b. This rotation moves the lower hook 68.

Next, an action of the cup holder 10 when the regular-size container 12 is held will be described.

As illustrated in FIG. 9A, the regular-size container 12 is about to be moved down in the cup holder 10. When the bottom of the regular-size container 12 abuts the cam plate 41, the cam plate 41 starts rotating around the first pin 42.

As illustrated in FIG. 9B, the regular-size container 12 is placed on the movable plate 30 after rotating the cam plate 41. The rotation of the cam plate 41 moves down the control rod 57, and the rotation plate 62 is rotated by the pushing action of the first torsion spring 63.

However, since the upper hook 65 and the lower hook 68 are fully apart from each other in the vertical direction, the lower hook 68 is not engaged with the upper hook 65.

Since being caught by the cam plate 41, the regular-size container 12 is stably held.

When the regular-size container 12 is moved up in the configuration in FIG. 9B, the configuration returns to FIG. 9A. In the case of the regular-size container 12, the configuration in FIG. 9A and the configuration in FIG. 9B are repeated.

Next, an action of the cup holder 10 when the long-size container 14 is held will be described.

As illustrated in FIG. 10A, the long-size container 14 is being moved down to the cup holder 10.

As illustrated in FIG. 10B, the controlled element 62a is located at the top portion 58d of the control rod 57.

As illustrated in FIG. 10C, the lower hook 68 is shifted by γ relative to upper hook 65 in the rotational direction.

As illustrated in FIG. 10D, the long-size container 14 is placed on the movable plate 30 after the cam plate 41 rotates.

As illustrated in FIG. 10E, the controlled element 62a is located at the bottom 58b of the V-shaped notch 58 of the control rod 57.

As illustrated in FIG. 10F, the lower hook 68 is rotated to the right in the figure relative to the upper hook 65 so as to cause γ to be 0 (zero, including substantially zero).

Meanwhile, in the configuration in FIG. 10D, the most part of the long-size container 14 is exposed, and the stability is still insufficient. Accordingly, a person in the vehicle further pushes down the long-size container 14. Since the configuration of the cam plate 41 remains unchanged at the time of this push-down, the control rod 57 maintains the configuration in FIG. 10E.

Figure 11A:
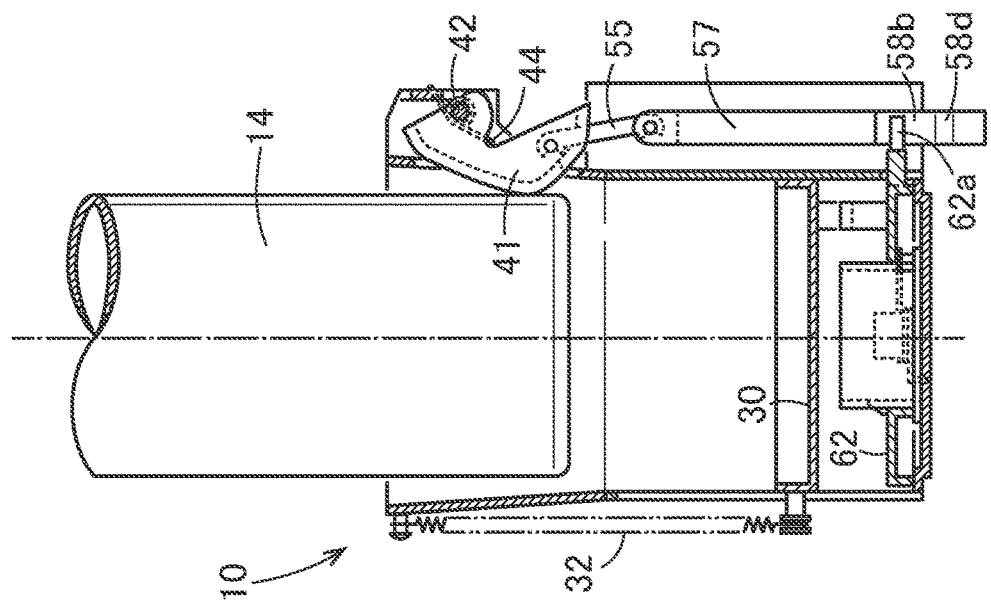
FIG. 11A is an explanatory diagram for a configuration after a long-size container is held.

As illustrated in FIG. 11A, the long-size container 14 has been moved down to a predetermined position together with the movable plate 30.

Figures 11B, 11C:
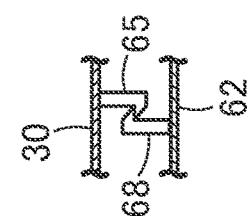
FIG. 11B is a diagram as viewed along an arrow 11B in FIG. 11A.
FIG. 11C is a cross-sectional view taken along a line 11C-11C in FIG. 11A.

As illustrated in FIG. 11B, the controlled element 62a remains at the bottom 58b of the control rod 57.

As illustrated in FIG. 11C, the lower hook 68 is engaged with the upper hook 65. This prevents the movable plate 30 from moving up, and thus the long-size container 14 is stably held.

Figure 11D:
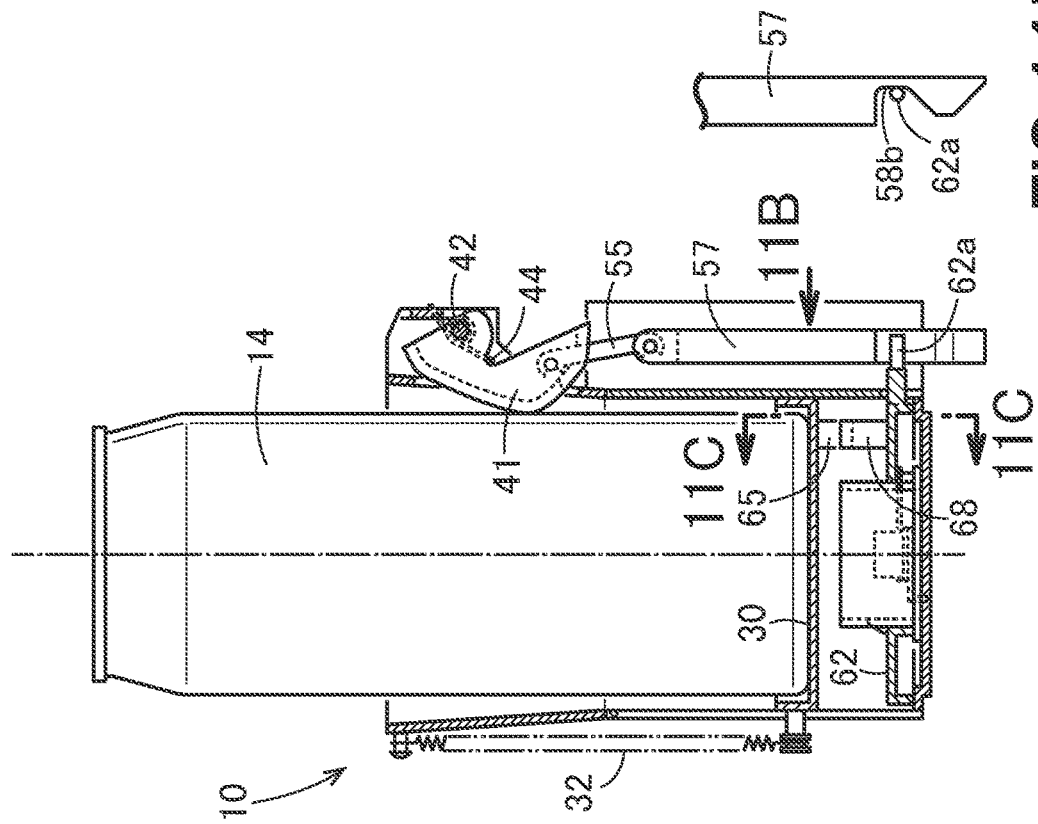
FIG. 11D is an explanatory diagram for a configuration when the long-size container is taken out.

When the long-size container 14 is lifted up from the configuration in FIG. 11A, as illustrated in FIG. 11D, the movable plate 30 remains at the low position until the long-size container 14 is detached from the cam plate 41.

When the long-size container 14 is further lifted up from the configuration in FIG. 11D, the long-size container 14 is detached from the cam plate 41. This detachment causes the cam plate 41 to rotate in the clockwise direction in the figure. In this case, the control rod 57 is pulled up and the controlled element 62a located at the bottom 58b moves to the top portion 58d. When the controlled element 62a is moved to the top portion 58d, the lower hook 68 is disengaged from the upper hook 65. Since the locking is released, the movable plate 30 is pulled up by the coil spring 32. Consequently, the configuration returns to the configuration in FIG. 10A.

As described above, according to the cup holder 10 illustrated in FIG. 7A, the coupling member 50 is the control rod 57 that moves up and down by the actuation of the container catching member 40, and the control rod 57 includes the V-shaped notch 58 at the lower part, and the top portion 58d corresponding to the edge of the V-shaped notch 58 and provided under this V-shaped notch 58.

Moreover, the locking mechanism 60 includes the rotation plate 62 provided so as to be freely rotatable at the bottom (bottom plate 66) of the holding member 20, the lower hook 68 extended upwardly from this rotation plate 62, the controlled element 62a extended from the rotation plate 62 to the control rod 57, and the torsion spring 63 that pushes this controlled element 62a toward the control rod 57.

The movable plate 30 includes the upper hook 65 that extends downwardly.

When the controlled element 62a is located at the top portion 58d (when abutting therewith), the lower hook 68 is located at the position that is not engaged with the upper hook 65, and when the controlled element 62a is located at the V-shaped notch 58 (preferably, on the bottom 58b of the V-shaped notch 58), the lower hook 68 is located at the position engaged with the upper hook 65.

Moreover, the major components of the locking mechanism 60 are constructed by the upper hook 65 and the lower hook 68. The lower hook 68 is engaged with the upper hook 65 for locking. Such a locking is not released by vibration, etc., enhancing the reliability of the cup holder 10.

Furthermore, the rotation plate 62 is provided at the holding member 20 that is different from the movable plate 30. Since the rotation plate 62 is supported at the holding-member-20 side, the movable plate 30 can be lightweight by such a support. This enables the spring constant of the coil spring 32 that pushes the movable plate 30 upwardly to be small. The small spring constant enables the user to push down the movable plate 30 by little force, and thus the actuation of the cup holder 10 becomes easy.

The rotation plate actuator 59 can employ various structures. A modified example of the rotation plate actuator 59 will be described below.

As illustrated in FIG. 12A, the rotation plate actuator 59 may be a cam groove 58f provided in the lower part of the control rod 57. The cam groove 58f is in a substantially S-shape. When the control rod 57 is moved down, the controlled element 62a moves to the right in the figure.

Consequently, the controlled element is moved to the position illustrated in FIG. 12B.

Alternatively, as illustrated in FIG. 12C, the rotation plate actuator 59 may include the inclined wall 58c, the top portion 58d, and the second inclined wall 58e which are formed so as to project from the lower part of the control rod 57.

When the control rod 57 moves down, the controlled element 62a moves along the inclined wall 58c.

Consequently, the controlled element moves to the position illustrated in FIG. 12D.

In addition to causing the control rod 57 to be moved down by the container catching member 40 pushed by the beverage container 12, the control rod 57 may be moved up. A specific example will be described below.

As illustrated in FIG. 13A, the second pin 47 disposed below the first pin 42 is disposed over, for example, the vertical (including substantially vertical) line that passes through the first pin 42.

As illustrated in FIG. 13B, the control rod 57 includes the top portion 58d, at the lower part, and the V-shaped notch 58 under this top portion 58d.

As illustrated in FIG. 13C, when pushed by the beverage container 12, the cam plate 41 rotates in the counterclockwise direction in the figure. This rotation moves up the second pin 47 and also moves up the link 55 and the control rod 57.

As illustrated in FIG. 13D, the controlled element 62a reaches the bottom 58b.

As described above, the rotation plate actuator 59 has a function of converting the vertical movement of the control rod 57 to the horizontal movement of the controlled element 62a, and various structures can be employed.

Next, a further modified example of the present disclosure will be described below.

Figure 14:
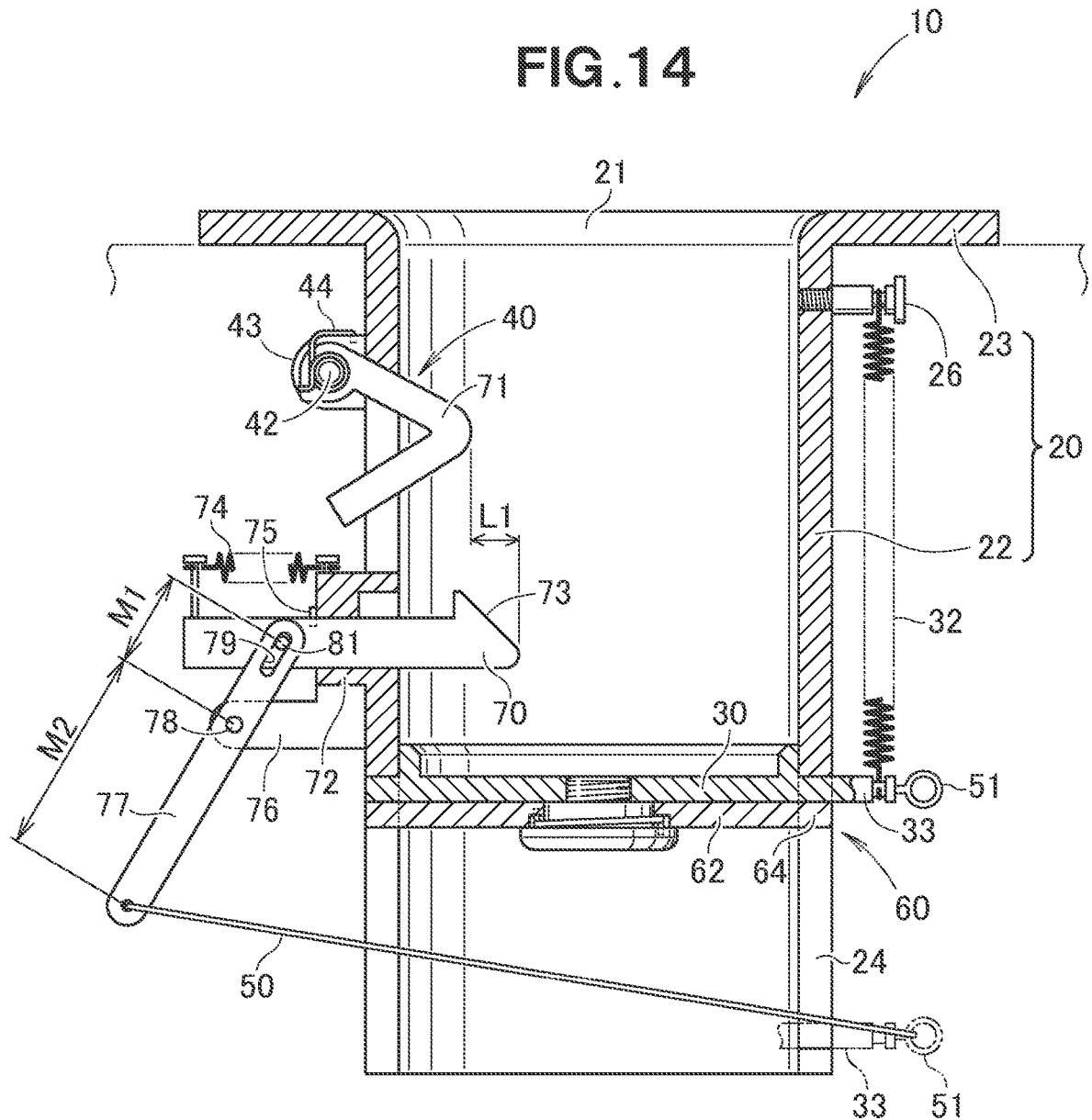
FIG. 14 is a cross-sectional view of a further modified example of the cup holder according to the present disclosure.

The cup holder 10 illustrated in FIG. 14 differs from FIG. 1 such that the container catching member 40 employs a simple structure and a driver 70 separately disposed from this container catching member 40 are provided at the cylindrical portion 22. The other components are the same as those in FIG. 1, and thus the same components will be denoted by the same reference numeral in FIG. 1, and the detailed description thereof will be omitted.

The container catching member 40 that employs a simple structure may be the one adopted for usual cup holders. For example, the container catching member 40 with a simple structure includes a V-shaped member 71, the first pin 42 and the bracket 43 which support the V-shaped member 71 on the cylindrical portion 22 so as to be freely rotatable, and the second torsion spring 44 which is tensioned between this bracket 43 and the V-shaped member 71 and which pushes the V-shaped member 71 into the cylindrical portion 22. That is, since the cam groove is unnecessary, the container catching member 40 in FIG. 14 is simplified.

The driver 70 is supported so as to be movable in the horizontal direction by a guide sleeve 72 formed integrally with the cylindrical portion 22, and has a tapered surface 73 on the tip. The tapered surface 73 converts the vertical movement of the beverage container into the horizontal movement.

An extension spring 74 is tensioned between the guide sleeve 72 and the base of the driver 70, and the tip of the driver 70 is pushed toward the center in the cylindrical portion 22.

Preferably, by driving in a stopper pin 75 in the base of the driver 70, the driver 70 is prevented from excessively advancing in the cylindrical portion 22.

It is appropriate as long as the tip of the driver 70 is present in the cylindrical portion 22, and the position of the tip is optional.

Preferably, the tip of the driver 70 is caused to advance in the cylindrical portion 22 from the V-shaped member 71 by a distance L1.

The bracket 76 is provided on the outer surface of the cylindrical portion 22, and a lever 77 is attached to the bracket 76 so as to be freely rotatable around a support pin 78.

An elongated hole 79 is provided in the end (in this modified example, the upper end) of this lever 77, and a drive pin 81 provided at the base of the driver 70 is fitted in this elongated hole 79.

The coupling member 50 is extended from the other end (in this modified example, the lower end) of such a lever 77.

When a distance from the support pin 78 to the drive pin 81 is M1 and a distance from the support pin 78 to the coupling member 50 is M2, it is preferable that M2 should be longer than M1. For example, a design is made such that 2×M1=M2.

In this case, when the driver 70 is retracted by a distance "1", the coupling member 50 is pulled by a distance "2". When the pull margin is large, an elongation that inevitably occurs on the coupling member 50 is allowed to some level. This allowance facilitates the length adjustment of the coupling member 50.

The cup holder 10 illustrated in FIG. 14 is in an empty condition (a configuration in which no beverage container is held, i.e., a standby condition) like FIG. 1.

Next, a configuration in which the beverage container is held will be described below.

As illustrated in FIG. 15A, when the long-size container 14 is fitted in from the upper opening 21, the driver 70 is retracted by a distance L2. This distance L2 is sufficiently larger than the distance L1 (see FIG. 14).

The long-size container 14 placed on the movable plate 30 is further pushed down. Consequently, as described with reference to FIG. 6A, the locking pawl 64 is moved down to the height of the locking recess 25.

Simultaneously, in the configuration in FIG. 15A, the lever 77 rotates around the support pin 78, and the coupling member 50 is un-tensioned. Consequently, as illustrated in FIG. 6A, the locking pawl 64 is engaged with the locking recess 25, and thus a locking condition is achieved.

Since the long-size container 14 is caught by appropriate force from the V-shaped member 71 that is pushed in the counterclockwise direction in the figure by the second torsion spring 44, thus being held stably.

When the long-size container 14 is manually pulled up, the long-size container is released from the driver 70. This causes the driver 70 to advance in the cylindrical portion 22.

Consequently, as illustrated in FIG. 14, the coupling member 50 becomes a tensioned condition, the cup holder changes the condition from the locking condition to the unlocking condition, and thus the movable plate 30 automatically moves up.

Meanwhile, beverage containers also have a slim-size container that has a smaller diameter than that of the long-size container 14 (and also the regular-size container 12).

As illustrated in FIG. 15B, when a slim-size container 16 is fitted in from the upper opening 21, the driver 70 is retracted by a distance L3. This distance L3 is consistent or substantially consistent with the distance L1 (see FIG. 14).

The slim-size container 16 placed on the movable plate 30 is further pushed down manually. Consequently, as described with reference to FIG. 6A, the locking pawl 64 is moved down to the height of the locking recess 25.

Simultaneously, in the configuration in FIG. 15B, the lever 77 rotates around the support pin 78, and the coupling member 50 is un-tensioned. Consequently, as described with reference to FIG. 6A, the locking pawl 64 is engaged with the locking recess 25, and thus a locking condition is achieved.

The plurality of (three or so) V-shaped members 71 are formed, and some of those are disposed at the opposite side to the driver 70. In this case, the slim-size container 16 is pushed by the driver 70 to the V-shaped members 71 located at the opposite side, thus being held stably.

When the slim-size container 16 is manually pulled up and is released from the driver 70, the driver 70 advances in the cylindrical portion 22.

This causes the coupling member 50 to be tensioned as illustrated in FIG. 14, the cup holder changes the condition from the locking condition to an unlocking condition, and the movable plate 30 automatically moves up.

According to the cup holder 10 illustrated in FIG. 14, in addition to the long-size container 14 and the regular-size container 12, the slim-size container 16 can be also held stably.

In FIG. 14, the lever ratio of the lever 77 can be designed optional, and there is no technical problem in practice if M1=M2 or M2<M1. When M1=M2, the overall length of the lever 77 can be reduced.

Since the cup holder 10 described with reference to FIG. 14 is provided with the driver 70, advantageous effects are achieved such that the container catching member 40 can be simplified, and the slim-size container 16 can be held.

In contrast, since the cup holder 10 described with reference to FIG. 1 includes the container catching member 40 that has a function as the driver 70, advantageous effects are achieved such that the driver 70 can be omitted and the number of components can be reduced.

Although the locking pawl 64 and the lower hook 68 are rotated and moved in the embodiment, the locking pawl 64 and the lower hook 68 may be designed so as to be moved linearly. Accordingly, the structure of the locking mechanism 60 can be changed as appropriate.

Moreover, the cup holder 10 may be an accessory for railroad vehicles, marine vessels, and airplanes in addition to the vehicles (such as a passenger automobile, a cargo truck, and a bus), and the location where the cup holder is attached is not limited to any particular location.

Moreover, although the beverage container is directly placed on the movable plate 30 in the embodiment, an elastic mat may be laid over on the surface of the movable plate 30, and the beverage container may be placed on this elastic mat. When the elastic mat is employed, a wear to the movable plate 30 can be reduced. Furthermore, when the beverage container hits the movable plate 30 with a great force, collision noises may be produced, but when the elastic mat is employed, noises can be dissipated. In addition, a reactive force applied to the hand of the user (the person in the vehicle) can be reduced.

What is claimed is:

1. A cup holder comprising:
a holding member, which has an upper surface where an opening is formed and which holds a beverage container that is fitted in from the opening;
a movable plate, which is attached to the holding member so as to be movable up and down and which supports a bottom of the beverage container; and
a container catching member, which is provided at the holding member and which elastically engages the beverage container placed on the movable plate,
wherein:
a locking mechanism is provided between the movable plate and a portion of the holding member, the locking mechanism being movable between a locked state, which prevents the movable plate from moving up and down relative to the holding member, and an unlocked state, which permits the movable plate to move up and down relative to the holding member; and
the cup holder further comprises a coupling member that transmits an actuation of the container catching member to the locking mechanism such that, when the container catching member is engaging the beverage container, the locking mechanism is in the locked state that prevents the movable plate from moving up and down, and when the container catching member is not engaging the beverage container, the locking mechanism is in the unlocked state that permits the movable plate to move up and down, wherein said coupling member is a string member.

2. A cup holder comprising:
a holding member, which has an upper surface where an opening is formed and which holds a beverage container that is fitted in from the opening;
a movable plate, which is attached to the holding member so as to be movable up and down and which supports a bottom of the beverage container; and
a container catching member, which is provided at the holding member and which elastically engages the beverage container placed on the movable plate,
wherein:
a locking mechanism is provided between the movable plate and a portion of the holding member, the locking mechanism being movable between a locked state, which prevents the movable plate from moving up and down relative to the holding member, and an unlocked state, which permits the movable plate to move up and down relative to the holding member; and
the cup holder further comprises a coupling member that transmits an actuation of the container catching member to the locking mechanism such that, when the container catching member is engaging the beverage container, the locking mechanism is in the locked state that prevents the movable plate from moving up and down, and when the container catching member is not engaging the beverage container, the locking mechanism is in the unlocked state that permits the movable plate to move up and down,
the locking mechanism comprises: a rotation plate provided at the bottom of the holding member so as to be freely rotatable; a lower hook that extends upwardly from the rotation plate; and an upper hook that extends downwardly from the movable plate;
the coupling member is a control rod that moves up and down in accordance with the actuation of the container catching member; and
the control rod comprises a rotation plate actuator that converts a vertical movement into a horizontal movement to rotate the rotation plate.

3. The cup holder according to claim 2, wherein the coupling member is a string member.

4. A cup holder comprising:
a holding member, which comprises a cylindrical portion that has an upper surface where an opening is formed and which holds a beverage container that is fitted in from the opening;
a movable plate, which is attached to the holding member so as to be movable up and down and which supports a bottom of the beverage container; and
a container catching member, which is provided at the holding member and which elastically catches the beverage container placed on the movable plate; and
a driver, which is attached to the holding member so as to be horizontally movable and which has a tip configured to advance into the cylindrical portion,
wherein:
a locking mechanism is provided between the movable plate and a portion of the holding member, the locking mechanism being movable between a locked state, which prevents the movable plate from moving up and down relative to the holding member, and an unlocked state, which permits the movable plate to move up and down relative to the holding member; and
the cup holder further comprises a coupling member that transmits an actuation of the driver to the locking mechanism such that, when the driver is pushed by the beverage container, the locking mechanism is in the locked state that prevents the movable plate from moving up and down, and when the driver is not pushed by the beverage container, the locking mechanism is in the unlocked state that permits the movable plate to move up and down.

5. The cup holder according to claim 4, wherein when the driver is not pushed by the beverage container, the tip of the driver advances in the cylindrical portion beyond the container catching member.

6. The cup holder according to claim 4, wherein the coupling member is a string member.

* * * * *